US012602750B2

(12) United States Patent
Fan et al.

(10) Patent No.: US 12,602,750 B2
(45) Date of Patent: Apr. 14, 2026

(54) DIFFERENTIABLE EMULATION OF NON-DIFFERENTIABLE IMAGE PROCESSING FOR ADJUSTABLE AND EXPLAINABLE NON-DESTRUCTIVE IMAGE AND VIDEO EDITING

(71) Applicant: ADOBE INC., San Jose, CA (US)

(72) Inventors: Yifei Fan, Santa Clara, CA (US); Peter Merrill, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 178 days.

(21) Appl. No.: 18/528,488

(22) Filed: Dec. 4, 2023

(65) Prior Publication Data

US 2025/0182248 A1     Jun. 5, 2025

(51) Int. Cl.
   G06T 5/60       (2024.01)
   G06T 3/4007     (2024.01)
          (Continued)
(52) U.S. Cl.
   CPC .............. G06T 5/60 (2024.01); G06T 3/4007 (2013.01); G06T 3/4046 (2013.01); G06T 11/00 (2013.01);
          (Continued)
(58) Field of Classification Search
   CPC ....... G06T 5/60; G06T 3/4007; G06T 3/4046; G06T 11/00; G06T 2207/10016;
          (Continued)

(56) References Cited

U.S. PATENT DOCUMENTS

2018/0144509 A1 * 5/2018 Risser ........................ G06T 7/45
2018/0225812 A1 * 8/2018 DiVerdi ............... G06V 10/764
          (Continued)

FOREIGN PATENT DOCUMENTS

CN         112581361  A  *  3/2021  ............. G06N 3/045
CN         115984121  A  *  4/2023

OTHER PUBLICATIONS

Zeng et al. Learning Image-Adaptive 3D Lookup Tables for High Performance Photo Enhancement in Real-Time [Online]. Apr. 2022 [Retrieved on Jul. 21, 2025]. Retrieved from the Internet: <URL: https://ieeexplore.ieee.org/document/9206076?source=IQplus> (Year: 2022).*

(Continued)

*Primary Examiner* — King Y Poon
*Assistant Examiner* — Michelle Hau Ma
(74) *Attorney, Agent, or Firm* — Shook, Hardy & Bacon L.L.P.

(57)                ABSTRACT

Methods and systems are provided for differentiable emulation of non-differentiable image processing for adjustable and explainable non-destructive image and video editing. In embodiments described herein, an emulator is trained to predict corresponding data structures from non-differentiable image processing control parameters, the data structures being differentiable with respect to each control parameter of the non-differentiable image processing control parameters. A translator is trained to predict a predicted set of control parameters from the non-differentiable image processing control parameters. An updated image is generated by applying the predicted set of control parameters from the translator to an input image. The updated image is subsequently displayed with the predicted set of control parameters.

20 Claims, 15 Drawing Sheets

(51) Int. Cl.
  *G06T 3/4046* (2024.01)
  *G06T 11/00* (2006.01)
(52) U.S. Cl.
  CPC .............. *G06T 2207/10016* (2013.01); *G06T 2207/20081* (2013.01); *G06T 2207/20084* (2013.01)
(58) Field of Classification Search
  CPC . G06T 2207/20081; G06T 2207/20084; G06T 7/10; G06T 2200/24
  See application file for complete search history.

(56) References Cited

U.S. PATENT DOCUMENTS

2020/0364500 A1* 11/2020 Huang ..................... G06N 3/08
2024/0265499 A1* 8/2024 Gong ........................ G06T 7/90

OTHER PUBLICATIONS

Saeedi et al. Multimodal Prediction and Personalization of Photo Edits with Deep Generative Models [Online]. Apr. 17, 2017 [Retrieved on Jul. 22, 2025]. Retrieved from the Internet: <URL: https://arxiv.org/abs/1704.04997 > (Year: 2017).*
Gharbi et al. Deep Bilateral Learning for Real-Time Image Enhancement [Online]. Aug. 22, 2017 [Retrieved on Jul. 24, 2025]. Retrieved from the Internet: <URL: https://arxiv.org/abs/1707.02880 > (Year: 2017).*
Huang et al. Learning Image-Adaptive Lookup Tables With Spatial Awareness for Image Harmonization [Online]. Sep. 29, 2023 [Retrieved on Jul. 24, 2025]. Retrieved from the Internet: <URL: https://ieeexplore.ieee.org/document/10268075 > (Year: 2023).*
Saharia et al. Photorealistic Text-to-Image Diffusion Models with Deep Language Understanding [Online]. May 23, 2022 [Retrieved on Jul. 24, 2025]. Retrieved from the Internet: <URL: https://arxiv.org/abs/2205.11487 > (Year: 2022).*
Zhang et al. STAR: A Structure-aware Lightweight Transformer for Real-time Image Enhancement [Online]. Feb. 28, 2022 [Retrieved on Jul. 24, 2025]. Retrieved from the Internet: <URL: https://ieeexplore.ieee.org/document/9710083 > (Year: 2022).*
Chen et al. Real-time edge-aware image processing with the bilateral grid [Online]. Jul. 29, 2007 [Retrieved on Jul. 23, 2025]. Retrieved from the Internet: <URL: https://dl.acm.org/doi/10.1145/1276377.1276506 > (Year: 2007).*
Brooks et al. InstructPix2Pix: Learning to Follow Image Editing Instructions [Online]. Jan. 18, 2023 [Retrieved on Jul. 29, 2025]. Retrieved from the Internet: <URL: https://arxiv.org/abs/2211.09800 > (Year: 2023).*
Screen captures from YouTube video clip entitled "Using Auto Tone, Auto Contrast and Auto Color in Photoshop," 6 pages, uploaded on Sep. 7, 2018 by user "Dominique Ramirez". Retrieved from Internet: <https://www.youtube.com/watch?v=Xfm_b5nKY7I>. (Year: 2018).*
Screen captures from YouTube video clip entitled "Photoshop 2022—Harmonization Neural Filter—Match Color and Tone," 6 pages , uploaded on Oct. 27, 2021 by user "Kingy AI". Retrieved from Internet: <https://www.youtube.com/watch?v=uJVk-bL5fS4>. (Year: 2021).*
Screen captures from YouTube video clip entitled "Remove HARSH Shadows & Highlights in Photoshop!," 6 pages, uploaded on Aug. 12, 2021 by user "PiXimperfect". Retrieved from Internet: < https://www.youtube.com/watch?v=kTLIwjVgpMQ>. (Year: 2021).*
Screen captures from YouTube video clip entitled "Relight Anything using Lighting Effects in Photoshop," 6 pages, uploaded on Feb. 4, 2021 by user "Design Dummy". Retrieved from Internet: < https://www.youtube.com/watch?v=ZcB-HsjhbwM>. (Year: 2021).*
Screen captures from YouTube video clip entitled "Create Dream-Like Images in Photoshop | Style Transfer Neural Filter," 6 pages, uploaded on Aug. 3, 2021 by user "PHLLEARN". Retrieved from Internet: <https://www.youtube.com/watch?v=uJVk-bL5fS4>. (Year: 2021).*
Shi et al. Differentiable Image Data Augmentation and Its Applications: A Survey [Online]. Nov. 7, 2023 [Retrieved on Dec. 11, 2025]. Retrieved from the Internet: <URL: https://ieeexplore.ieee.org/abstract/document/10310260 > (Year: 2023).*
Li et al. Differentiable Programming for Image Processing and Deep Learning in Halide [Online]. Aug. 2018 [Retrieved on Dec. 11, 2025]. Retrieved from the Internet: <URL: https://dl.acm.org/doi/pdf/10.1145/3197517.3201383 > (Year: 2018).*
Mordvintsev et al. Differentiable Image Parameterizations [Online]. Jul. 25, 2018 [Retrieved on Dec. 11, 2025]. Retrieved from the Internet: <URL: https://distill.pub/2018/differentiable-parameterizations/ > (Year: 2018).*
Nishimura et al., "Automatic ISP Image Quality Tuning Using Non-linear Optimization", 25th IEEE International Conference on Image Processing (ICIP), 2018, 5 pages.
Onzon et al., "Neural Auto-Exposure for High-Dynamic Range Object Detection", 2021 IEEE/CVF Conference on Computer Vision and Pattern Recognition, Jun. 2021, pp. 7710-7720.
Picsart, "Picsart Creative Platform: Photo, Video Editing and Design Tools", Available online at: <https://picsart.com/>, Retrieved on Sep. 20, 2021, 3 pages.
Ramanath et al., "Color Image Processing Pipeline", IEEE Signal Processing Magazine, vol. 22, No. 1, Jan. 2005, pp. 34-43.
Shao et al., "From Heuristic Optimization to Dictionary Learning: A Review and Comprehensive Comparison of Image Denoising Algorithms", IEEE Transactions on Cybernetics, vol. 44, No. 7, Jul. 2014, pp. 1001-1013.
Shi et al., "ZeroScatter: Domain Transfer for Long Distance Imaging and Vision through Scattering Media", Available online at: <https://arxiv.org/pdf/2102.05847v2.pdf>, Mar. 30, 2021, 11 pages.
Szegedy et al., "Rethinking the Inception Architecture for Computer Vision", Available online at: <https://arxiv.org/pdf/1512.00567v3.pdf>, Dec. 11, 2015, 10 pages.
Tseng et al., "Hyperparameter Optimization in Black-box Image Processing Using Differentiable Proxies", ACM Transactions on Graphics, vol. 1, No. 1, Apr. 2019, 14 pages.
Tseng et al., "Neural Photo-Finishing", ACM Transactions on Graphics, vol. 41, No. 6., Dec. 2022, pp. 1-15.
Wu et al., "FBNet: Hardware-Aware Efficient ConvNet Design via Differentiable Neural Architecture Search", Available online at: <https://arxiv.org/pdf/1812.03443v3.pdf>, May 24, 2019, 10 pages.
Xia et al., "Joint Bilateral Learning for Real-time Universal Photorealistic Style Transfer", Available online at: <https://arxiv.org/pdf/2004.10955v2.pdf>, Apr. 27, 2020, 16 pages.
Yoo et al., "Photorealistic Style Transfer via Wavelet Transforms", Available online at: <https://arxiv.org/pdf/1903.09760v2.pdf>, Sep. 29, 2019, 17 pages.
Yu et al., "ReconfigISP: Reconfigurable Camera Image Processing Pipeline", 2021 IEEE/CVF International Conference on Computer Vision (ICCV), Oct. 2021, 10 pages.
Zhang et al., "Color Demosaicking by Local Directional Interpolation and Nonlocal Adaptive Thresholding", Journal of Electronic Imaging, vol. 20, No. 2, Apr. 2011, 18 pages.
Zhang et al., "The Unreasonable Effectiveness of Deep Features as a Perceptual Metric", Available online at: <https://arxiv.org/pdf/1801.03924v2.pdf>, Apr. 10, 2018, 14 pages.
Zhou et al., "BayesNAS: A Bayesian Approach for Neural Architecture Search", Available online at: <https://arxiv.org/pdf/1905.04919>, Jun. 7, 2019, 25 pages.
Zhou et al., "EcoNAS: Finding Proxies for Economical Neural Architecture Search", Available online at: <https://arxiv.org/pdf/2001.01233v2.pdf>, Feb. 27, 2020, 12 pages.
Zhu et al., "Unpaired Image-to-Image Translation using Cycle-Consistent Adversarial Networks", 2017 IEEE International Conference on Computer Vision (ICCV), Oct. 2017, 10 pages.
"Darktable", Available online at: <https://www.darktable.org/>, Retrieved on Oct. 9, 2022, 3 pages.
"1/2.5-Inch 5 Mp CMOS Digital Image Sensor", Onsemi, Available online at: <https://www.onsemi.com/pdf/datasheet/mt9p001-d.pdf>, Jan. 2017, 34 pages.

(56)                References Cited

OTHER PUBLICATIONS

Abdal et al., "Image2StyleGAN: How to Embed Images into the StyleGAN Latent Space?", 2019 IEEE/CVF International Conference on Computer Vision (ICCV), Available online at: <https://arxiv.org/pdf/1904.03189>, Sep. 3, 2019, 23 pages.
Abdelhamed et al., "A High-Quality Denoising Dataset for Smartphone Cameras", 2018 IEEE/CVF Conference on Computer Vision and Pattern Recognition, Jun. 2018, 9 pages.
Adobe Inc., "Adobe Camera Raw", Available online at: <https://helpx.adobe.com/camera-raw/using/supported-cameras.html>, 2003, 4 pages.
Adobe Inc., "Adobe Photoshop Lightroom", Available online at: <https://www.adobe.com/products/photoshop-lightroom.html>, Retrieved on Oct. 5, 2022, 8 pages.
Adobe Inc., "Digital Negative (DNG)", Available online at: < https://helpx.adobe.com/camera-raw/digital-negative.html>, Retrieved on Oct. 5, 2022, 8 pages.
Afifi et al., "Color Temperature Tuning: Allowing Accurate Post-Capture White-Balance Editing", 27th Color and Imaging Conference, Available online at: <https://cvil.eecs.yorku.ca/projects/public_html/ColorTemperatureTuning/files/ColorTemperatureTuning.pdf>, 2019, 6 pages.
Afifi et al., "Learning Multi-Scale Photo Exposure Correction", Available online at: <https://arxiv.org/pdf/2003.11596.pdf>, Version 3, Mar. 30, 2021, 23 pages.
Afifi et al., "Semi-Supervised Raw-to-Raw Mapping", Available online at: <https://arxiv.org/pdf/2106.13883.pdf>, Version 3, Sep. 6, 2021, 12 pages.
Afifi et al., "Deep White-Balance Editing", 2020 IEEE/CVF Conference on Computer Vision and Pattern Recognition (CVPR), Available online at: <https://arxiv.org/pdf/2004.01354>, Apr. 3, 2020, 10 pages.
Afifi et al., "Interactive White Balancing for Camera-Rendered Images", Available online at: <https://arxiv.org/pdf/2009.12632.pdf>, Version 1, Sep. 26, 2020, 6 pages.
Ahmad et al., "Automatically Translating Image Processing Libraries to Halide", ACM Transactions on Graphics, vol. 38, No. 6, Nov. 2019, 13 pages.
Apple Inc., "About Apple ProRAW", Available online at: <https://support.apple.com/en-us/HT211965>, Sep. 28, 2022, 3 pages.
Bergstra et al., "Random Search for Hyper-Parameter Optimization", The Journal of Machine Learning Research, vol. 13, Feb. 1, 2012, pp. 281-305.
Bergstra et al., "Hyperopt: A Python Library for Optimizing the Hyperparameters of Machine Learning Algorithms", Proceedings of the 12th Python in Science Conference (SciPy 2013), Jan. 2013, 8 pages.
Bonneel et al., "Example-Based Video Color Grading", ACM Transactions on Graphics, vol. 32, No. 4, 2013, 11 pages.
Bychkovsky et al., "Learning Photographic Global Tonal Adjustment with a Database of Input/Output Image Pairs", CVPR 2011, Jun. 2011, pp. 97-104.
Chen et al., "Fast Image Processing with Fully-Convolutional Networks", 2017 IEEE International Conference on Computer Vision (ICCV), 2017, 16 pages.
Chen et al., "Learning to See in the Dark", IEEE Conference on Computer Vision and Pattern Recognition (CVPR), 2018, 10 pages.
Chen et al., "ZOO: Zeroth Order Optimization based Black-box Attacks to Deep Neural Networks without Training Substitute Models", AISec '17: Proceedings of the 10th ACM Workshop on Artificial Intelligence and Security, Nov. 3, 2017, 13 pages.
Conde et al., "Model-Based Image Signal Processors via Learnable Dictionaries", Proceedings of the AAAI Conference on Artificial Intelligence, vol. 36, No. 1, 2022, pp. 481-489.
Deng et al., "ImageNet: A Large-Scale Hierarchical Image Database", Proceedings of IEEE Conference on Computer Vision and Pattern Recognition, Jun. 2009, 8 pages.
Diamond et al., "Dirty Pixels: Towards End-to-End Image Processing and Perception", ACM Transactions on Graphics, vol. 40, No. 3, May 5, 2021, 15 pages.

Du et al., "Video Recoloring via Spatial-Temporal Geometric Palettes", ACM Transactions on Graphics, vol. 40, No. 4, Jul. 19, 2021, 16 pages.
Dumoulin et al., "A Learned Representation for Artistic Style", International Conference on Learning Representations (ICLR) 2017, Feb. 9, 2017, 26 pages.
Efros et al., "Image Quilting for Texture Synthesis and Transfer", SIGGRAPH '01: Proceedings of the 28th Annual Conference on Computer Graphics and interactive techniques, Aug. 1, 2001, 6 pages.
Eismann et al., "Photoshop Restoration & Retouching—Fourth Edition", New Riders, 2019, 1016 pages.
Gatys et al., "Image Style Transfer Using Convolutional Neural Networks", 2016 IEEE Conference on Computer Vision and Pattern Recognition (CVPR), Jun. 2016, pp. 2414-2423.
Gharbi et al., "Deep Bilateral Learning for Real-Time Image Enhancement", ACM Transactions on Graphics, vol. 36, No. 4, Jul. 20, 2017, pp. 1-12.
Gharbi et al., "Deep Joint Demosaicking and Denoising", ACM Transactions on Graphics, vol. 35, No. 6, Dec. 2016, 13 pages.
Hansen, N., "The CMA Evolution Strategy: A Comparing Review", Towards a New Evolutionary Computation, Studies in Fuzziness and Soft Computing, vol. 192, 2006, pp. 75-102.
He et al., "Deep Residual Learning for Image Recognition", 2016 IEEE Conference on Computer Vision and Pattern Recognition (CVPR), 2016, pp. 770-778.
Hegarty et al., "Darkroom: Compiling High-level Image Processing Code Into Hardware Pipelines", ACM Transactions on Graphics, vol. 33, No. 4, Jul. 2014, 11 pages.
Heide et al., "Flexlsp: A Flexible Camera Image Processing Framework", ACM Transactions on Graphics, vol. 33, No. 6, Nov. 2014, 13 pages.
Hertzmann et al., "Image Analogies", SIGGRAPH '01: Proceedings of the 28th Annual Conference on Computer Graphics and Interactive Techniques, Aug. 2001, 14 pages.
Howard et al., "MobileNets: Efficient Convolutional Neural Networks for Mobile Vision Applications", Available online at: <https://arxiv.org/abs/1704.04861>, Apr. 17, 2017, 9 pages.
Hu et al., "Exposure: A White-Box Photo Post-Processing Framework", ACM Transactions on Graphics, vol. 37, No. 2, 2018, 23 pages.
Ignatov et al., "Replacing Mobile Camera ISP with a Single Deep Learning Model", Available online at: <https://arxiv.org/abs/2002.05509>, Feb. 13, 2020, 11 pages.
Isola et al., "Image-to-Image Translation with Conditional Adversarial Networks", 2017 IEEE Conference on Computer Vision and Pattern Recognition (CVPR), 2017, pp. 1125-1134.
Johnson et al., "Perceptual Losses for Real-Time Style Transfer and Super-Resolution", Available online at: <https://arxiv.org/abs/1603.08155>, Mar. 27, 2016, 18 pages.
Karaimer et al., "A Software Platform for Manipulating the Camera Imaging Pipeline", European Conference on Computer Vision (ECCV 16), Oct. 2016, 16 pages.
Karras et al., "A Style-Based Generator Architecture for Generative Adversarial Networks", Available online at: <https://arxiv.org/pdf/1812.04948.pdf>, Version 3, Mar. 29, 2019, 12 pages.
Kingma et al., "Adam: A Method for Stochastic Optimization", Available online at: <https://arxiv.org/pdf/1412.6980v9.pdf>, Version 9, Jan. 30, 2017, 15 pages.
Li et al., "Differentiable Programming for Image Processing and Deep Learning in Halide", ACM Transactions on Graphics, vol. 37, No. 4, Aug. 2018, pp. 1-13.
Liu et al., "Single-Image HDR Reconstruction by Learning to Reverse the Camera Pipeline", Available online at: <https://arxiv.org/pdf/2004.01179.pdf>, Apr. 2, 2020, 10 pages.
Martinez-Cantin, R., "BayesOpt: A Bayesian Optimization Library for Nonlinear Optimization, Experimental Design and Bandits", Available online at: <https://arxiv.org/pdf/1405.7430.pdf>, May 30, 2014, 5 pages.
Mckay et al., "A Comparison of Three Methods for Selecting Values of Input Variables in the Analysis of Output from a Computer Code", Technometrics, vol. 21, No. 2, May 1979, 7 pages.

(56)           References Cited

OTHER PUBLICATIONS

Mildenhall et al., "NeRF in the Dark: High Dynamic Range View Synthesis from Noisy Raw Images", Available online at: <https://arxiv.org/pdf/2111.13679v1.pdf>, Nov. 26, 2021, 18 pages.
Mosleh et al., "Hardware-in-the-Loop End-to-End Optimization of Camera Image Processing Pipelines", 2020 IEEE/CVF Conference on Computer Vision and Pattern Recognition (CVPR), 2020, 10 pages.

* cited by examiner

INPUT IMAGE/VIDEO 212

IMAGE/VIDEO EDITING MANAGER ⌒202

EMULATOR 204

TRANSLATOR 206

MULTI-THREADED RENDERING ENGINE 208

DATA STORE 210

OUTPUT EDITED IMAGE/VIDEO 214

900

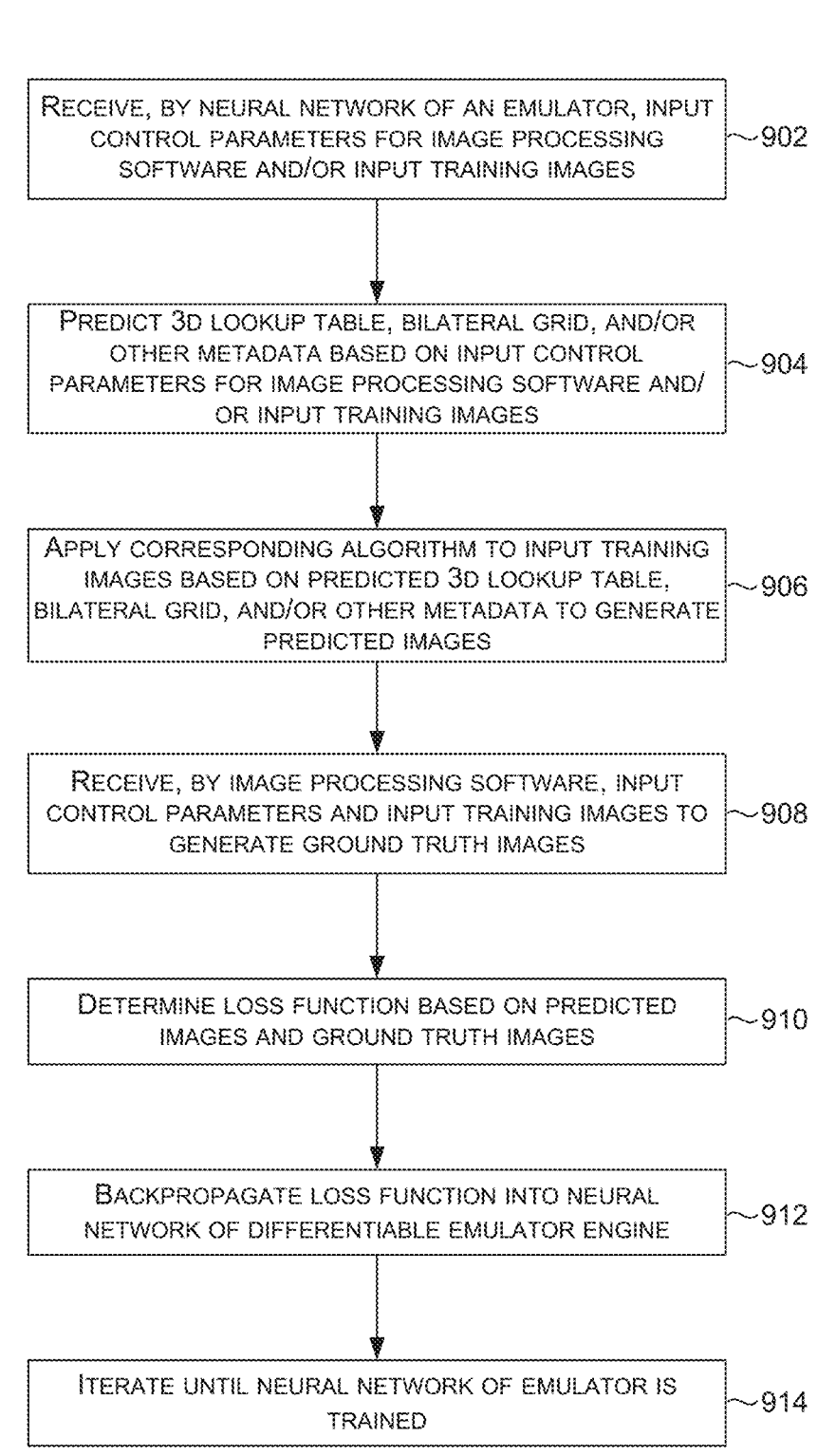

RECEIVE, BY NEURAL NETWORK OF AN EMULATOR, INPUT CONTROL PARAMETERS FOR IMAGE PROCESSING SOFTWARE AND/OR INPUT TRAINING IMAGES ~902

PREDICT 3D LOOKUP TABLE, BILATERAL GRID, AND/OR OTHER METADATA BASED ON INPUT CONTROL PARAMETERS FOR IMAGE PROCESSING SOFTWARE AND/OR INPUT TRAINING IMAGES ~904

APPLY CORRESPONDING ALGORITHM TO INPUT TRAINING IMAGES BASED ON PREDICTED 3D LOOKUP TABLE, BILATERAL GRID, AND/OR OTHER METADATA TO GENERATE PREDICTED IMAGES ~906

RECEIVE, BY IMAGE PROCESSING SOFTWARE, INPUT CONTROL PARAMETERS AND INPUT TRAINING IMAGES TO GENERATE GROUND TRUTH IMAGES ~908

DETERMINE LOSS FUNCTION BASED ON PREDICTED IMAGES AND GROUND TRUTH IMAGES ~910

BACKPROPAGATE LOSS FUNCTION INTO NEURAL NETWORK OF DIFFERENTIABLE EMULATOR ENGINE ~912

ITERATE UNTIL NEURAL NETWORK OF EMULATOR IS TRAINED ~914

FIG. 9

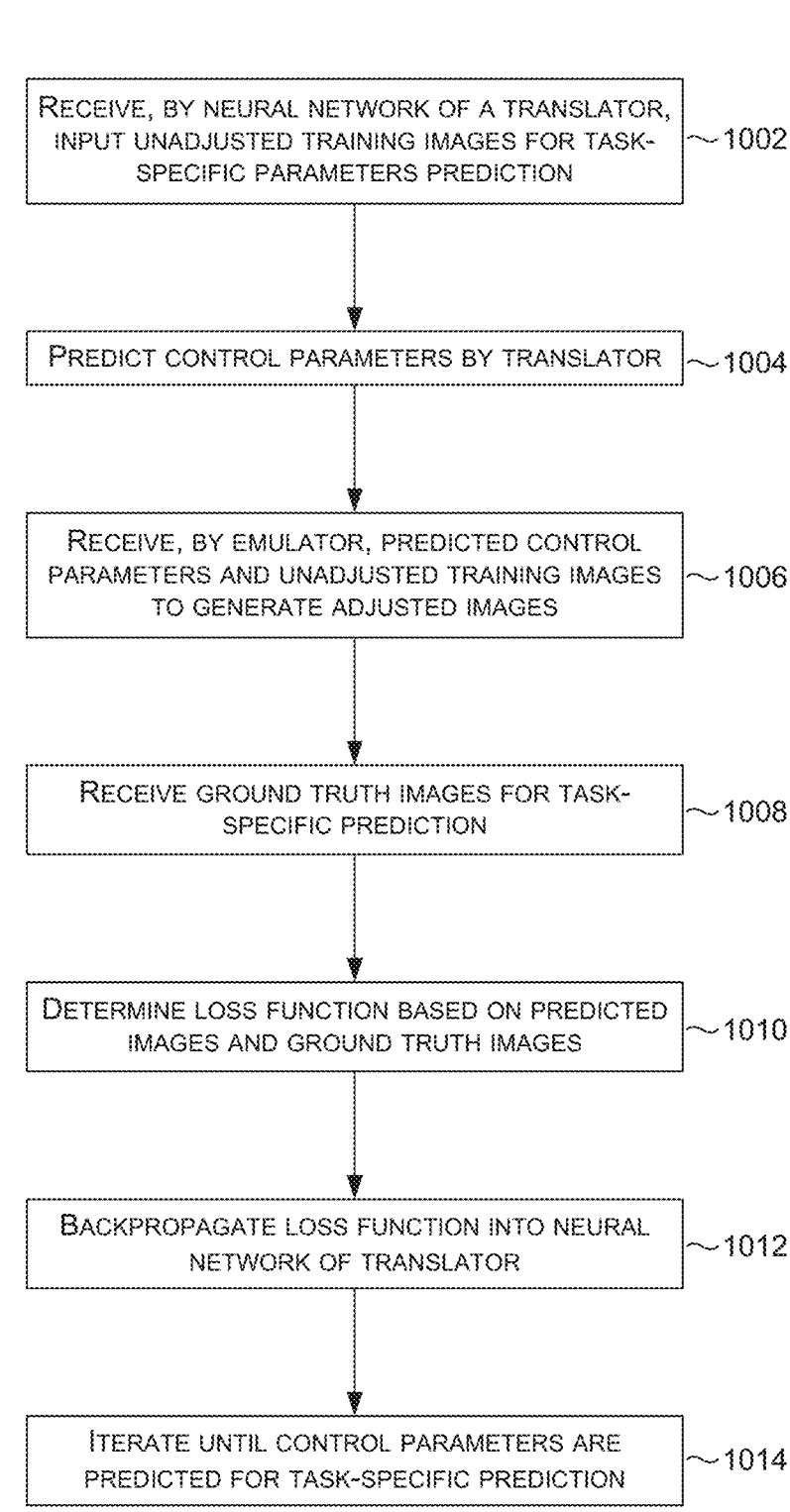

1000

RECEIVE, BY NEURAL NETWORK OF A TRANSLATOR, INPUT UNADJUSTED TRAINING IMAGES FOR TASK-SPECIFIC PARAMETERS PREDICTION ~1002

PREDICT CONTROL PARAMETERS BY TRANSLATOR ~1004

RECEIVE, BY EMULATOR, PREDICTED CONTROL PARAMETERS AND UNADJUSTED TRAINING IMAGES TO GENERATE ADJUSTED IMAGES ~1006

RECEIVE GROUND TRUTH IMAGES FOR TASK-SPECIFIC PREDICTION ~1008

DETERMINE LOSS FUNCTION BASED ON PREDICTED IMAGES AND GROUND TRUTH IMAGES ~1010

BACKPROPAGATE LOSS FUNCTION INTO NEURAL NETWORK OF TRANSLATOR ~1012

ITERATE UNTIL CONTROL PARAMETERS ARE PREDICTED FOR TASK-SPECIFIC PREDICTION ~1014

RECEIVE, BY TRANSLATOR, INPUT UNADJUSTED IMAGES FOR TASK-SPECIFIC CONTROL PARAMETERS PREDICTION ~1102

PREDICT CONTROL PARAMETERS BY TRANSLATOR BASED ON SPECIFIC TASK ~1104

RECEIVE, BY EMULATOR, PREDICTED CONTROL PARAMETERS AND INPUT UNADJUSTED IMAGES ~1106

GENERATE, BY EMULATOR, OUTPUT ADJUSTED IMAGES FOR DISPLAY WITH PREDICTED CONTROL PARAMETERS ~1108

1200

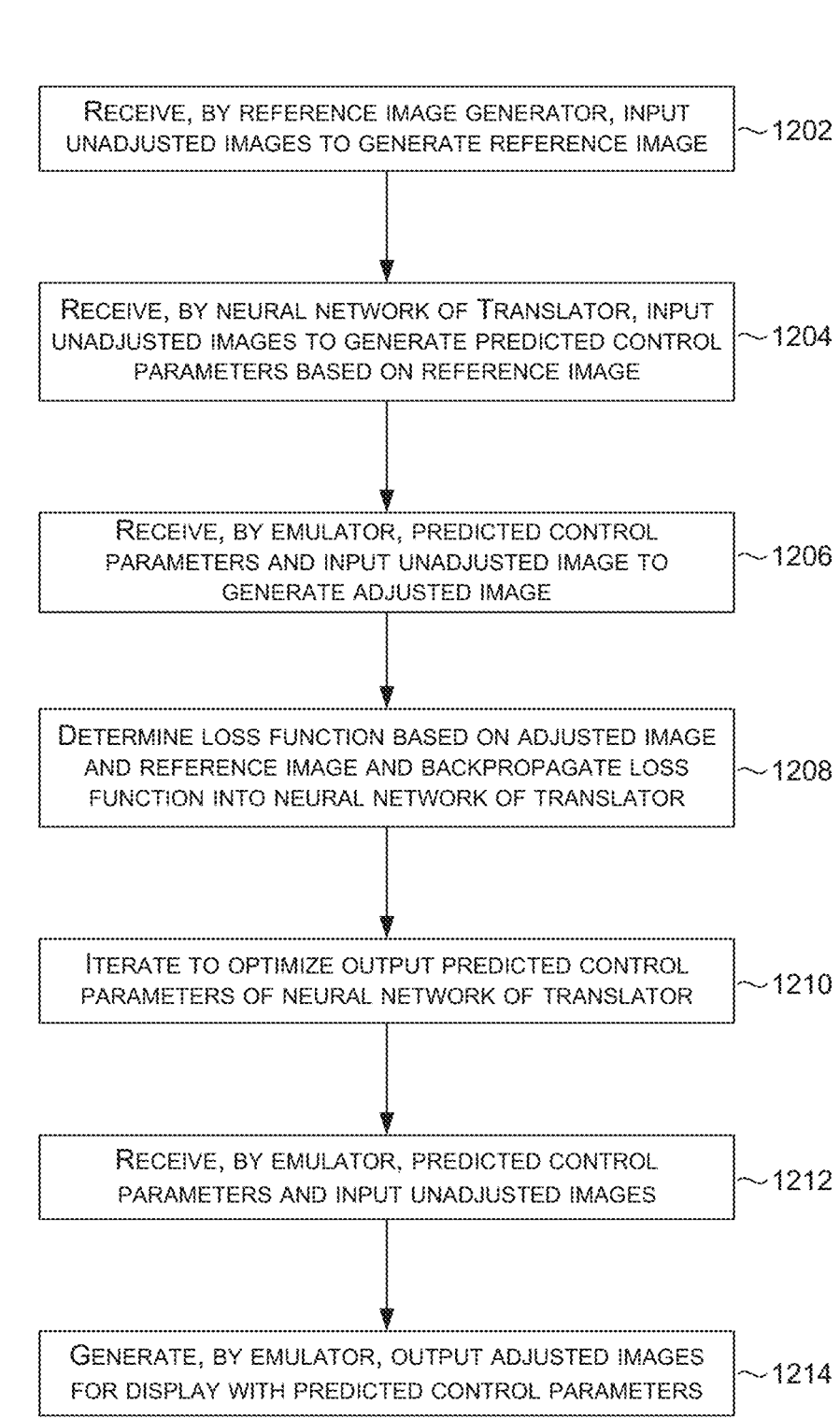

RECEIVE, BY REFERENCE IMAGE GENERATOR, INPUT UNADJUSTED IMAGES TO GENERATE REFERENCE IMAGE ~1202

RECEIVE, BY NEURAL NETWORK OF TRANSLATOR, INPUT UNADJUSTED IMAGES TO GENERATE PREDICTED CONTROL PARAMETERS BASED ON REFERENCE IMAGE ~1204

RECEIVE, BY EMULATOR, PREDICTED CONTROL PARAMETERS AND INPUT UNADJUSTED IMAGE TO GENERATE ADJUSTED IMAGE ~1206

DETERMINE LOSS FUNCTION BASED ON ADJUSTED IMAGE AND REFERENCE IMAGE AND BACKPROPAGATE LOSS FUNCTION INTO NEURAL NETWORK OF TRANSLATOR ~1208

ITERATE TO OPTIMIZE OUTPUT PREDICTED CONTROL PARAMETERS OF NEURAL NETWORK OF TRANSLATOR ~1210

RECEIVE, BY EMULATOR, PREDICTED CONTROL PARAMETERS AND INPUT UNADJUSTED IMAGES ~1212

GENERATE, BY EMULATOR, OUTPUT ADJUSTED IMAGES FOR DISPLAY WITH PREDICTED CONTROL PARAMETERS ~1214

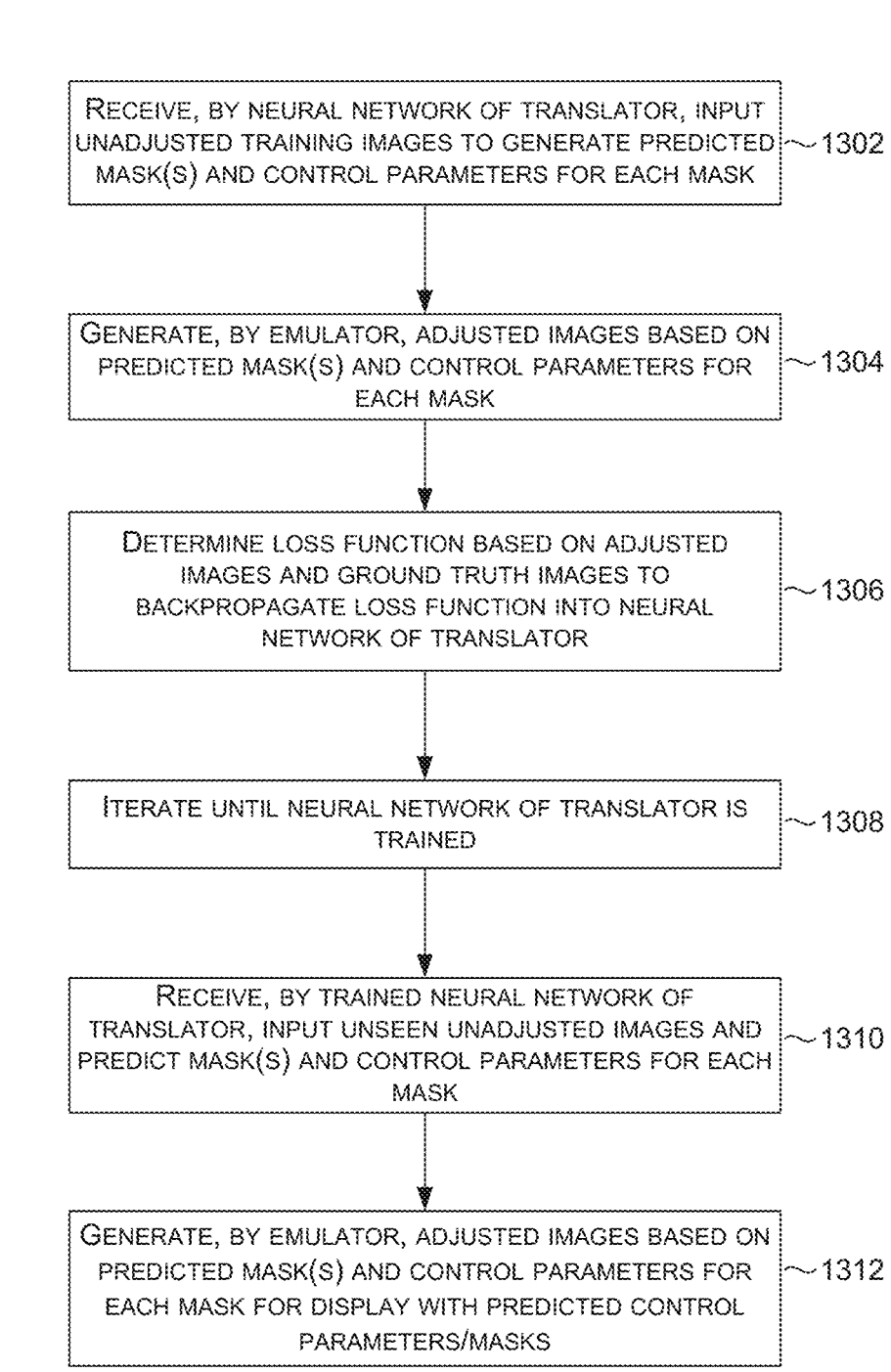

RECEIVE, BY NEURAL NETWORK OF TRANSLATOR, INPUT UNADJUSTED TRAINING IMAGES TO GENERATE PREDICTED MASK(S) AND CONTROL PARAMETERS FOR EACH MASK ~1302

GENERATE, BY EMULATOR, ADJUSTED IMAGES BASED ON PREDICTED MASK(S) AND CONTROL PARAMETERS FOR EACH MASK ~1304

DETERMINE LOSS FUNCTION BASED ON ADJUSTED IMAGES AND GROUND TRUTH IMAGES TO BACKPROPAGATE LOSS FUNCTION INTO NEURAL NETWORK OF TRANSLATOR ~1306

ITERATE UNTIL NEURAL NETWORK OF TRANSLATOR IS TRAINED ~1308

RECEIVE, BY TRAINED NEURAL NETWORK OF TRANSLATOR, INPUT UNSEEN UNADJUSTED IMAGES AND PREDICT MASK(S) AND CONTROL PARAMETERS FOR EACH MASK ~1310

GENERATE, BY EMULATOR, ADJUSTED IMAGES BASED ON PREDICTED MASK(S) AND CONTROL PARAMETERS FOR EACH MASK FOR DISPLAY WITH PREDICTED CONTROL PARAMETERS/MASKS ~1312

MEMORY

1412

PROCESSOR(S)

1414

PRESENTATION
COMPONENT(S)

1416

RADIO(S)

1424

I/O PORT(S)

1418

I/O COMPONENTS

1420

POWER SUPPLY

1422

1410

DIFFERENTIABLE EMULATION OF NON-DIFFERENTIABLE IMAGE PROCESSING FOR ADJUSTABLE AND EXPLAINABLE NON-DESTRUCTIVE IMAGE AND VIDEO EDITING

BACKGROUND

Image processing techniques are employed by computing devices to impart visual effects to digital image inputs. Comparable to how a darkroom is used to develop photographic film, image processing software is used by photofinishing pipelines to render digital photographs by converting camera sensor measurements into recognizable images. To do so, conventional photofinishing pipelines involve a user interactively adjusting "slider values" that control visual attributes (e.g., exposure, contrast, temperature, etc.) until the user is satisfied with the result. These methods enable a high degree of user control, however, are time consuming and limited by the expertise of the user. Automatic tuning approaches exist, such as options to apply preset slider values or a "filter" to a digital image, however these "one-size-fits all" approaches negate fine-tuned user control and limit creative capabilities.

SUMMARY

Various aspects of the technology described herein are generally directed to systems, methods, and computer storage media for, among other things, differentiable emulation of non-differentiable image processing for adjustable and explainable non-destructive image and video editing in an efficient and effective manner. Generally, and at a high level, embodiments described herein facilitate training an emulator-translator framework to predict control parameters (e.g., slider values that control visual attributes, such as exposure, contrast, temperature, etc., or any type of parameters, settings, values, etc.) based on input image data and a target outcome in order to provide adjustable and explainable control parameters for non-destructive image and video editing. For example, an emulator can be trained to closely match the non-differentiable image processing software when rendering input images according to control parameters by predicting data structures that are differentiable with respect to the control parameters. Utilizing data structures that are differentiable with respect to control parameters predicted by the emulator, a translator of the emulator-translator framework can be trained to predict corresponding control parameters for various target outcomes (e.g., auto-tone, auto-color-recommendation, harmonization, relighting, exemplar-based style transfer, language/text-driven editing, shadow removal, etc.). The predicted control parameters by the translator of the emulator-translator framework can then be displayed to an end user for viewing and adjusting to facilitate adjustable and explainable non-destructive image and video editing directly in the non-differentiable image processing software or through the emulator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 provides an example flow diagram of training a neural network of an emulator for non-destructive image and video editing, in accordance with embodiments of the present disclosure.

FIG. 10 provides an example flow diagram of training a neural network of a translator for non-destructive image and video editing, in accordance with embodiments of the present disclosure.

FIG. 12 provides an example flow diagram of iterative control parameter prediction through an emulator-translator framework for non-destructive image and video editing, in accordance with embodiments of the present disclosure.

FIG. 13 provides an example flow diagram of local control parameter prediction through an emulator-translator framework for non-destructive image and video editing, in accordance with embodiments of the present disclosure.

DETAILED DESCRIPTION

Figure 1:
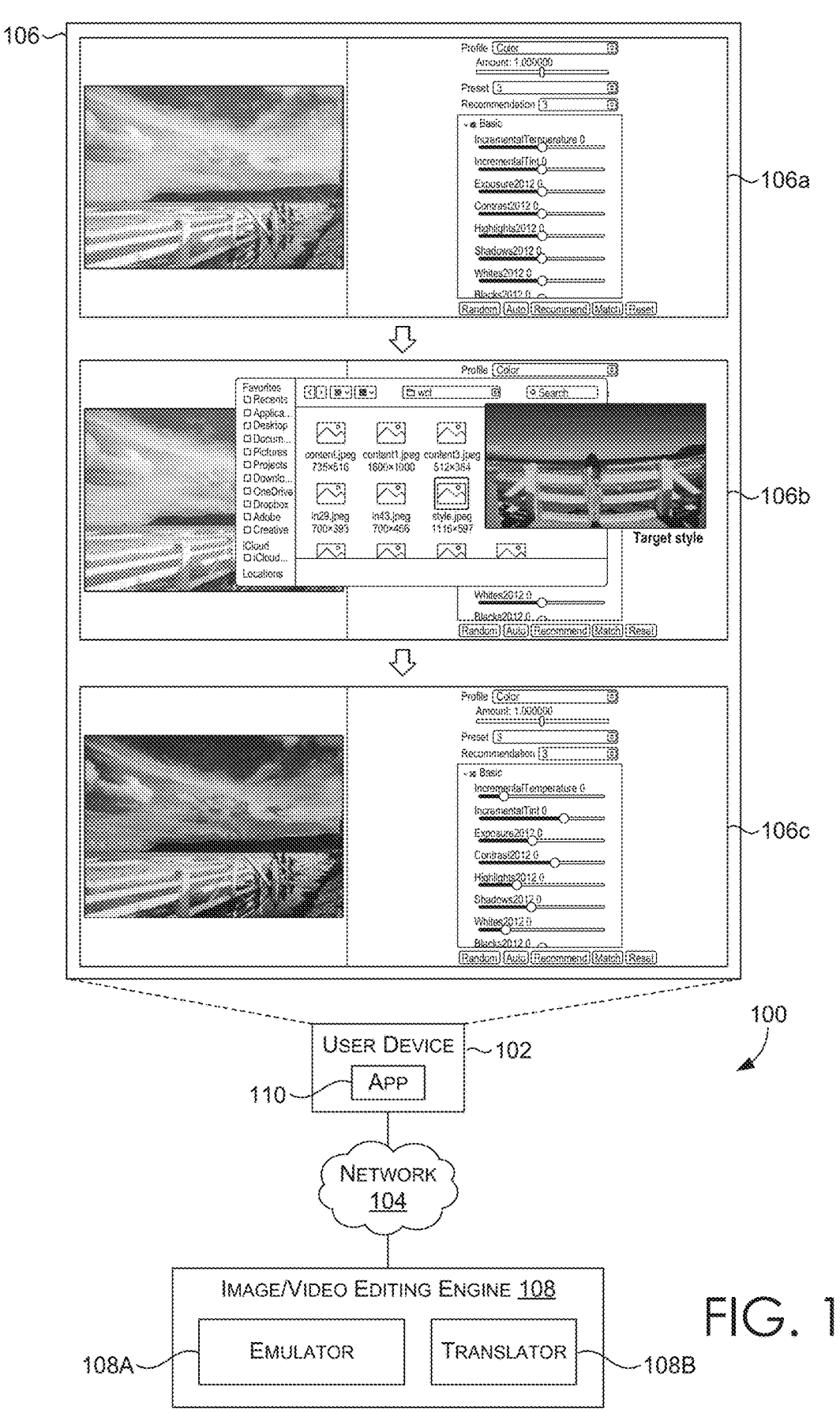
FIG. 1 depicts a diagram of an environment in which one or more embodiments of the present disclosure can be practiced, in accordance with various embodiments of the present disclosure.

Conventional image processing techniques such as photofinishing pipelines include a series of processing "blocks" to sequentially apply algorithm-based transformations to an input image. Each processing block corresponds to a transformation to modify a particular visual attribute of the input image. To implement the transformations, these conventional techniques involve a user interactively controlling "slider values" to adjust the visual attributes of the input image to generate an output image. However, due to the sequential topology of such conventional pipelines, transformations applied early in the pipeline can cause significant downstream changes.

Further, these pipelines can be non-differentiable, such that mathematical determinations of how changes to an input image and/or slider values affect the output image are not obtainable. Accordingly, a user relying on conventional techniques is forced to "guess and check" as to slider values that result in a visually appealing output which is time consuming and uninformative for future image processing actions. Additionally, the lack of insight from non-differentiable pipelines inhibits machine learning applications. Some conventional techniques include automatic slider setting tools such as "auto-adjust" features, however these "one-size-fits all" techniques negate fine-tuned user control and further do not consider features of an input image.

Machine learning approaches have been developed for image processing tasks. One conventional machine learning approach utilizes a generative adversarial network to enable editing by modifying a latent code. However, these techniques entangle visual attributes and thus fail to provide intuitive control over editing, thereby resulting in destructive editing in that the original image data is not maintained. Other conventional machine learning techniques approximate reference photofinishing pipelines "end-to-end," for instance based on input images and corresponding output images by the reference photofinishing pipelines. These monolithic techniques do not provide consideration for intermediate transformations, and instead attempt to model the pipeline "as a whole." Accordingly, these conventional techniques involve a substantial amount of training data and further fail to accurately model complex transformations present in reference photofinishing pipelines. Thus, conventional machine learning approaches are computationally expensive to train and fail to accurately approximate reference photofinishing pipelines.

The image editing pipelines that are non-differentiable often allow for non-destructive image editing. Non-destructive image editing refers to a method of modifying digital images without permanently altering the original image data. In traditional image editing workflows, when you make changes to an image and save it, the modifications are directly applied to the original file, resulting in a loss of the original data (e.g., destructive editing). Non-destructive editing, on the other hand, allows you to apply changes to an image while preserving the original data intact. Instead of directly modifying the original file, non-destructive editing creates a separate set of instructions or metadata that describes the changes to the original image. This metadata can include information such as adjustments, filters, layers, masks, and other modifications.

In this regard, for non-destructive image processing software (e.g., editing photos, video frames of a video, etc.) where the output of the software (e.g., the edited image) is non-differentiable, the user must iteratively guess and check slider values and the user is unable to take advantage of certain machine learning approaches for image processing as certain machine learning approaches cannot be applied directly to non-differentiable output. Thus, the iterative process of guessing and checking slider values is computationally expensive and increases latency. Further, unnecessary wear is placed on the read/write head of the disk of the disk array when the data generated during image editing is located in a disk array and multiple iterations of slider values are performed. Further, when the data generated during image editing is stored over a network, the processing of the multiple iterations of slider values decreases the throughput for a network, increases the network latency, and increases packet generation costs. In this regard, usage of network resources is multiplied due to the number of iterations of slider values that must be performed during image editing.

As such, embodiments of the present disclosure facilitate differentiable emulation of non-differentiable image processing for adjustable and explainable non-destructive image and video editing in an efficient and effective manner. Generally, and at a high level, embodiments described herein facilitate training an emulator-translator framework to predict control parameters based on input image data and a target outcome in order to provide adjustable and explainable control parameters for non-destructive image and video editing. For example, an emulator can be trained to closely match the non-differentiable image processing software when rendering input images according to control parameters by predicting data structures that are differentiable with respect to the control parameters. Utilizing data structures that are differentiable with respect to control parameters predicted by the emulator, a translator of the emulator-translator framework can be trained to predict corresponding control parameters for various target outcomes (e.g., auto-tone, auto-color-recommendation, harmonization, relighting, exemplar-based style transfer, language/text-driven editing, shadow removal, etc.). The predicted control parameters by the translator of the emulator-translator framework can then be displayed to an end user for viewing and adjusting to facilitate adjustable and explainable non-destructive image and video editing directly in the non-differentiable image processing software or through the emulator.

In operation, as described herein, an emulator of the emulator-translator framework can be trained to predict data structures based on control parameters of non-differentiable image processing software where the predicted data structures are differentiable with respect to the control parameters and closely match the control parameters of non-differentiable image processing software when rendering input images. In some embodiments, the emulator is a transformer model. In some embodiments, the emulator is a convolutional neural network (CNN). The data structures predicted by the emulator that are differentiable with respect to control parameters can include 3D LUTs, bilateral grids, or other metadata that is differentiable with respect to control parameters of non-differentiable image processing software. In this regard, images modified by specific control parameters of non-differentiable image processing software will closely match images modified by data structures predicted by the emulator based on the specific control parameters. The resolution of images can be lowered during training of the emulator in order to optimize training of the emulator. The lowered resolution also benefits translator, speeding up the process of finding optimal control parameters. In this regard, in embodiments described herein, the emulator allows for batch processing.

Utilizing data structures that are differentiable with respect to control parameters predicted by the emulator, a translator of the emulator-translator framework can be trained to predict corresponding control parameters for various target outcomes (e.g., auto-tone, auto-color-recommendation, harmonization, relighting, exemplar-based style transfer, language/text-driven editing, shadow removal, etc.) for input images. In some embodiments, input images can be both captured or created, either RAW format or renditions. In some embodiments, a task-specific research model (e.g., a model that generates images modified for a target outcome) can be used to generate reference images in order to train the neural network of the translator to predict corresponding control parameters for the input image based on the reference image. In some embodiments, the task-specific research model is a language model. For example, a text-to-image diffusion model can be utilized to generate a reference image based on textual input of corresponding features into the text-to-image diffusion model.

In some embodiments, the translator can be trained to predict control parameters for a specific target outcome based on ground truth images of the target outcome, such as ground truth images with auto-tone, auto-color-recommendation, harmonization, relighting, exemplar-based style transfer, language/text-driven editing, shadow removal, etc. applied to the ground truth images. In some embodiments, the control parameter prediction can be performed in an iterative process in order to reduce the size of the neural network of the translator. In some embodiments, the neural network can be trained to predict control parameters in a single-shot, as opposed to an iterative process, in order to increase the speed of the translator. In some embodiments, the translator can be trained for local control parameter prediction, such as by predicting masks of an image and predicting control parameters for each mask of the image. Further, the resolution of images can be lowered during training of the translator in order to optimize training of the translator.

After the translator predicts control parameters for a target outcome for an input image, the predicted control parameters can then be displayed to an end user for viewing and adjusting. In some embodiments, the predicted control parameters are displayed and/or adjusted through the non-differentiable image processing software. In some embodiments, the predicted control parameters are displayed and/or adjusted through the emulator. In this regard, the emulator-translator framework facilitates adjustable and explainable non-destructive image and video editing in an efficient and effective manner.

In some embodiments, video rendering is optimized through multi-threaded rendering of video by allocating a thread for computing control parameters of video frames (e.g., through a translator) and a thread for rendering the video frames (e.g., through an emulator or directly through the non-differentiable image processing software). In some embodiments, the rendering of video can be further optimized by including only a subset of operators (e.g., control parameters and/or masks predicted), reducing the input resolution (e.g., the video frame resolution is lowered for computing control parameters and/or rendering of video based on the processing speed required), running in batch (e.g., computing control parameters for a video frame to be applied to multiple video frames), only applying the adjustments to portions of each frame, reducing the model size for the translator, reducing the number of iterations of minimizing the loss function for control parameters prediction, and/or etc.

Advantageously, efficiencies of computing and network resources can be enhanced using implementations described herein. In particular, differentiable emulation of non-differentiable image processing for adjustable and explainable non-destructive image and video editing provides for a more efficient use of computing resources (e.g., higher throughput and reduced latency for a network, less packet generation costs, etc.) than conventional methods of iteratively updating slider values as machine learning models can be trained to automatically determine the necessary control parameters through the use of an emulator for the non-differentiable, non-destructive image processing software. The technology described herein results in less iterations of guessing control parameters to iteratively edit images which is less computationally expensive. Further, the decrease in the iterations of guessing control parameters to iteratively edit images over a computer network results in higher throughput, reduced latency and less packet generation costs as fewer packets are sent over a network. Therefore, the technology described herein conserves network resources. Further, the technology described herein optimizes the training and outputting of control parameters from the neural networks used for both emulation and translation of images based on low-resolution images, which provides a more efficient use of computing resources by reducing the usage of computing and network resources based on the size of the images. Further, the technology described herein optimizes the rendering of images, such as during video rendering, by allocating two threads running asynchronously to speed up the video rendering as one thread analyzes video frames to compute control parameters and the second thread renders frames from control parameters calculated by the first thread.

Turning to the figures, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 14.

It should be understood that operating environment 100 shown in FIG. 1 is an example of one suitable operating environment. Among other components not shown, operating environment 100 includes a user device 102, application 110, network 104, and image/video editing engine 108 with emulator 108A and translator 108B. Operating environment 100 also shows an example of the prediction of control parameters of a reference-image and applying the control parameters to an input image in example 106. Example 106 includes an example unadjusted image 106A, an example reference image 106B, and an example adjusted image 106C based on the control parameters predicted from the reference image. Each of the components shown in FIG. 1 can be implemented via any type of computing device, such as one or more of computing device 1400 described in connection to FIG. 14, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., an artist or any user that edits images/video). For example, in some implementations, such devices are the type of computing device described in relation to FIG. 14. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

Application 110 operating on user device 102 can generally be any application capable of displaying images/video. In some implementations, the application 110 comprises a web application, which can run in a web browser, and could be hosted at least partially server-side (e.g., via image/video editing engine 108). In addition, or instead, the application 110 can comprise a dedicated application. In some cases, the application 110 is integrated into the operating system (e.g., as a service). As specific example applications, application 110 may be a video editor website or application, a photo editor website or application, a digital drawing website or application, a digital graphics editor website or application, an animation website or application, or any website or application that is capable of using or displaying images and/or video. Such an application may be accessed via a mobile application, a web application, or the like.

User device 102 can be a client device on a client-side of operating environment 100, while image/video editing engine 108 can be on a server-side of operating environment 100. Image/video editing engine 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or image/video editing engine 108 to remain as separate entities.

Application 110 operating on user device 102 can generally be any application capable of facilitating the exchange of information between the user device 102 and the image/video editing engine 108 in displaying and exchanging information regarding images and/or video and the editing of the images and/or video. In some implementations, the application 110 comprises a web application, which can run in a web browser, and could be hosted at least partially on the server-side of environment 100. In addition, or instead, the application 110 can comprise a dedicated application. In some cases, the application 110 is integrated into the operating system (e.g., as a service). It is therefore contemplated herein that "application" be interpreted broadly.

In accordance with embodiments herein, application 110 is, or is in communication with, a non-differentiable image processing software that allows a user to edit images (e.g., a photograph, a video frame, etc.) by adjusting control parameters and outputs non-differentiable metadata to be stored along with the image based on the adjustments to the control parameters. The application 110 can facilitate differentiable emulation of non-differentiable image processing for adjustable and explainable non-destructive image and video editing in an efficient and effective manner through image/video editing engine 108.

At a high level, image/video editing engine 108 performs various functionality to facilitate efficient and effective differentiable emulation of non-differentiable image processing for adjustable and explainable non-destructive image and video editing. The image/video editing engine 108 can communicate with application 110 in order for application 110 to display the image and/or video, control parameters to edit the image and/or video, and edited image and/or video via a display screen of the user device 102. In this regard, image/video editing engine 108 can receive data regarding the image from application 110 of the user device.

In embodiments, image/video editing engine 108 includes emulator 108A. Emulator 108A of the emulator-translator framework (e.g., emulator 108A and translator 108B) can be trained to predict data structures based on control parameters of non-differentiable image processing software where the predicted data structures are differentiable with respect to the control parameters and closely match the control parameters of non-differentiable image processing software when rendering input images. In some embodiments, emulator 108A is a transformer model. In some embodiments, emulator 108A is a CNN. The data structures predicted by emulator 108A that are differentiable with respect to control parameters can include 3D LUTs, bilateral grids, or other metadata that is differentiable with respect to control parameters of non-differentiable image processing software. In this regard, images modified by specific control parameters of non-differentiable image processing software will closely match images modified by data structures predicted by emulator 108A based on the specific control parameters. The resolution of images can be lowered during training of emulator 108A in order to optimize training of the emulator. The lowered resolution also benefits translator 108B, speeding up the process of finding optimal control parameters. In this regard, in embodiments described herein, emulator 108A allows for batch processing. Embodiments of emulator 108A are further described with respect to 204 of FIG. 2, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.

In embodiments, image/video editing engine 108 includes translator 108B. Utilizing data structures that are differentiable with respect to control parameters predicted by emulator 108A, translator 108B of the emulator-translator framework (e.g., emulator 108A and translator 108B) can be trained to predict corresponding control parameters for various target outcomes (e.g., auto-tone, auto-color-recommendation, harmonization, relighting, exemplar-based style transfer, language/text-driven editing, shadow removal, etc.) for input images. In some embodiments, a task-specific research model (e.g., a model that generates images modified by for a target outcome) can be used to generate reference images in order to train the neural network of translator 108B to predict corresponding control parameters for the input image based on the reference image. In some embodiments, the task-specific research model is a language model. For example, a text-to-image diffusion model can be utilized to generate a reference image based on textual input of corresponding features into the text-to-image diffusion model.

In some embodiments, translator 108B can be trained to predict control parameters for a specific target outcome based on ground truth images of the target outcome, such as ground truth images with auto-tone, auto-color-recommendation, harmonization, relighting, exemplar-based style transfer, language/text-driven editing, shadow removal, etc. applied to the ground truth images. In some embodiments, the control parameter prediction can be performed in an iterative process in order to reduce the size of the neural network of translator 108B. In some embodiments, the neural network of translator 108B can be trained to predict control parameters in a single-shot, as opposed to an iterative process, in order to increase the speed of translator 108B. In some embodiments, translator 108B can be trained for local control parameter prediction, such as by predicting masks of an image and predicting control parameters for each mask of the image. The resolution of images can be lowered during training of translator 108B in order to optimize training of translator 108B. Embodiments of translator 108B are further described with respect to 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.

In some embodiments, image/video editing engine 108 with emulator 108A and translator 108B is optimized for multi-threaded rendering of video by allocating a thread for computing control parameters of video frames (e.g., through translator 108B) and a thread for rendering the video frames (e.g., through emulator 108A and/or the non-differentiable image processing software) based on the control parameters computed by the thread for computing control parameters. In this regard, in embodiments utilizing a multi-threaded rendering approach, the division of the processing by multiple threads allows for parallel execution of rendering tasks. In some embodiments, the rendering of video can be further optimized by activating only a subset of operators (e.g., control parameters and/or masks predicted), reducing the input resolution (e.g., the video frame resolution is lowered for computing control parameters and/or rendering of video based on the processing speed required), running in batch (e.g., computing control parameters for a video frame to be applied to multiple video frames), only applying the adjustments to portions of each frame, reducing the model size for the translator 108B, reducing the number of iterations of minimizing the loss function for control parameters prediction by translator 108B, and/or etc.

An example of predicting control parameters (e.g. based on a reference image) using differentiable emulation of non-differentiable image processing for adjustable and explainable non-destructive image and video editing is shown as example 106. In operation, an image is displayed via a graphical user interface provided via the application 110. For example, example unadjusted image 106A shows an image of a beach. Along with the image of the beach in example unadjusted image 106A, the user interface (UI) shows a number of control parameters (e.g., temperature, tint, exposure, contrast, highlights, shadows, whites, blacks, etc.) to edit the image. As can be understood, any amount and types of control parameters for editing an image are within the scope of the present disclosure. Further, as can be understood, any adjustments to the control parameters to adjust the image are stored as metadata to the image so that the image editing is non-destructive.

In the example 106, the user can select the 'match' selection of the UI and open a reference image in example reference image 106B. As can be understood, the reference image includes a different color scheme and style than the image of example unadjusted image 106A. Translator 108B predicts a set of control parameters based on the example reference image 106B and the example unadjusted image 106A. The process of predicting control parameters based on the example reference image 106B and the example unadjusted image 106A is described in further detail with respect to the translator 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.

In some embodiments, the control parameters predicted by translator 108B based on the example reference image 106B and the example unadjusted image 106A is utilized by emulator 108A or directly by the non-differentiable image processing software to generate example adjusted image 106C. As shown in example adjusted image 106C, the predicted control parameters are different than the control parameters of example unadjusted image 106A and are based on the example reference image 106B. The adjusted control parameters of example adjusted image 106C can be stored as metadata for the image so that the image editing is non-destructive. Further, in embodiments, the user can make further adjustments to the predicted control parameters as shown in example adjusted image 106C. In some embodiments, the user can make further adjustments to the predicted control parameters through emulator 108A. In some embodiments, the user can make further adjustments to the predicted control parameters through the non-differentiable image processing software.

As further shown in example unadjusted image 106A, the user can also select other selections (e.g., 'random,' 'auto,' 'recommend,' etc.) and models trained using emulator 108A and translator 108B may be utilized to generate adjusted images based on predicted control parameters from translator 108B (e.g., based on reference images generated by language models, based on specific desired outcomes/tasks, etc.) or 'reset' to reset the image to the original image (e.g., as the image editing is non-destructive).

Thus, image/video editing engine 108 performs various functionality to facilitate efficient and effective differentiable emulation of non-differentiable image processing for adjustable and explainable non-destructive image and video editing. The image/video editing engine 108 can communicate with application 110 in order for application 110 to display the image and/or video, control parameters to edit the image and/or video, and edited image and/or video via a display screen of the user device 102. In this regard, image/video editing engine 108 can receive data regarding the image from application 110 of the user device.

Image/video editing engine 108 can be or include a server, including one or more processors, and one or more computer-readable media. The computer-readable media includes computer-readable instructions executable by the one or more processors. The instructions can optionally implement one or more components of image/video editing engine 108, described in additional detail below with respect to image/video editing manager 202 of FIG. 2.

For cloud-based implementations, the instructions on image/video editing engine 108 can implement one or more components, and application 110 can be utilized by a user to interface with the functionality implemented on image/video editing engine 108. In some cases, application 110 comprises a web browser. In other cases, image/video editing engine 108 may not be required. For example, the components of image/video editing engine 108 may be implemented completely on a user device, such as user device 102. In this case, image/video editing engine 108 may be embodied at least partially by the instructions corresponding to application 110.

Thus, it should be appreciated that image/video editing engine 108 may be provided via multiple devices arranged in a distributed environment that collectively provide the functionality described herein. Additionally, other components not shown may also be included within the distributed environment. In addition, or instead, image/video editing engine 108 can be integrated, at least partially, into a user device, such as user device 102. Furthermore, image/video editing engine 108 may at least partially be embodied as a cloud computing service.

Figure 2:
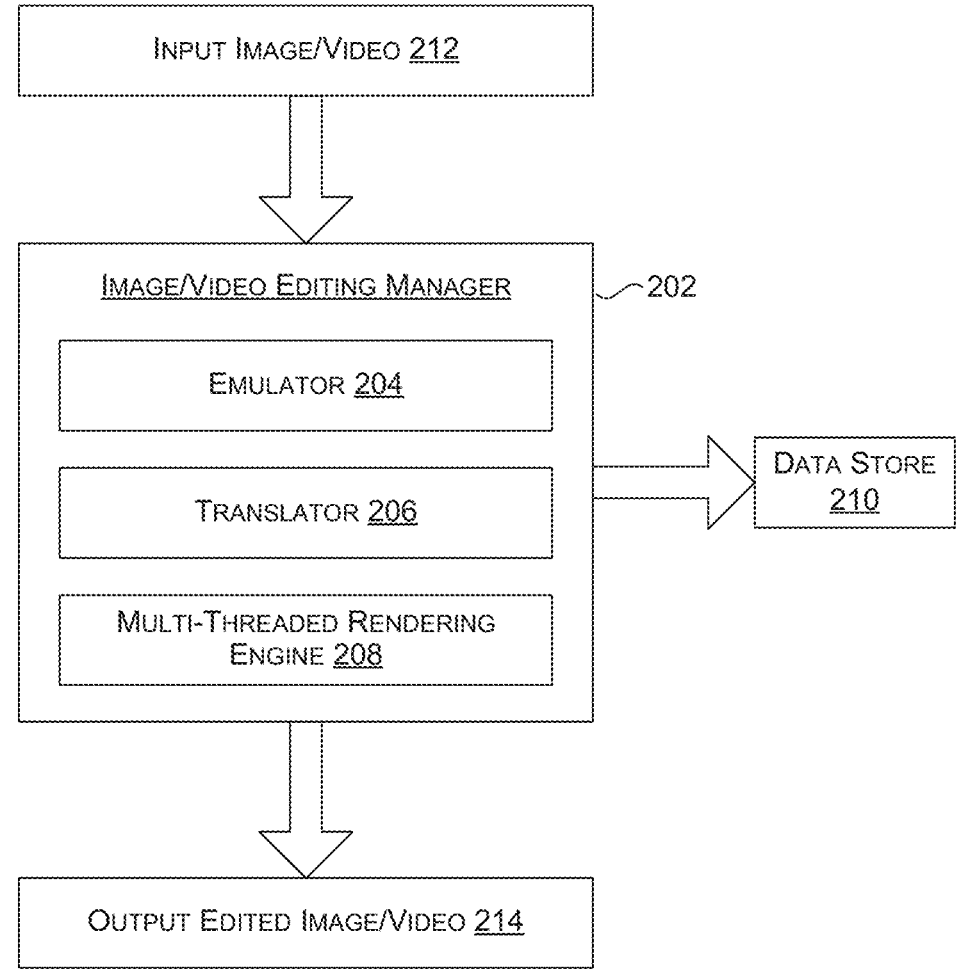
FIG. 2 depicts an example configuration of an operating environment in which some implementations of the present disclosure can be employed, in accordance with various embodiments of the present disclosure.

Referring to FIG. 2, aspects of an illustrative image and/or video editing management system are shown, in accordance with various embodiments of the present disclosure. At a high level, the image and/or video editing management system can facilitate the training of an emulator-translator framework to predict control parameters based on input image data and a target outcome in order to provide adjustable and explainable control parameters for non-destructive image and video editing.

As shown in FIG. 2, image/video editing manager 202 includes emulator 204, translator 206, and multi-threaded rendering engine 208. Input image/video 212 is input into image/video editing manager 202 and image/video editing manager 202 outputs output edited image/video 214 for presentation. The image/video editing manager 202 can communicate with the data store 210. The data store 210 is configured to store various types of information accessible by image/video editing manager 202, or other server or component. The foregoing components of image/video editing manager 202 can be implemented, for example, in operating environment 100 of FIG. 1. In particular, those components may be integrated into any suitable combination of user devices 102 and/or image/video editing engine 108.

In embodiments, data sources (such as input image/video 212 and output edited image/video 214), user devices (such as user device 102 of FIG. 1), and image/video editing manager 202 can provide data to the data store 210 for storage, which may be retrieved or referenced by any such component. As such, the data store 210 can store computer instructions (e.g., software program instructions, routines, or services), data and/or models used in embodiments described herein, such as images and/or corresponding metadata of the images for non-destructive editing of the images, video and/or corresponding metadata of the video for non-destructive editing of the video, algorithms for editing the images and/or video, and/or the like. In some implementations, data store 210 can store information or data received or generated via the various components of image/video editing manager 202 and provides the various components with access to that information or data, as needed. The information in data store 210 may be distributed in any suitable manner across one or more data stores for storage (which may be hosted externally).

The emulator 204 is generally configured to predict data structures based on control parameters of non-differentiable image processing software where the predicted data structures are differentiable with respect to the control parameters and closely match the control parameters of non-differentiable image processing software when rendering input images. Further, in embodiments, the emulator 204 is generally configured to modify images based on the predicted data structures. In embodiments, emulator 204 can include rules, conditions, associations, models, algorithms, or the like to predict data structures and/or modify images. Emulator 204 may take on different forms depending on the mechanism used to predict data structures and/or modify images. For example, emulator 204 may comprise a language model, statistical model, fuzzy logic, neural network, finite state machine, support vector machine, logistic regression, clustering, or machine-learning techniques, similar statistical classification processes, or combinations of these to predict data structures and/or modify images.

In embodiments, emulator 204 of the emulator-translator framework (e.g., emulator 204 and translator 206) can be trained to predict data structures based on control parameters of non-differentiable image processing software where the predicted data structures are differentiable with respect to the control parameters and closely match the control parameters of non-differentiable image processing software when rendering input images. In some embodiments, emulator 204 is a transformer model. In some embodiments, emulator 204 is a convolutional neural network (CNN). The data structures predicted by emulator 204 that are differentiable with respect to control parameters can include 3D LUTs, bilateral grids, or other metadata that is differentiable with respect to control parameters of non-differentiable image processing software. In this regard, images modified by specific control parameters of non-differentiable image processing software will closely match images modified by data structures predicted by emulator 204 based on the specific control parameters. The resolution of images can be lowered during training of emulator 204 in order to optimize training of the emulator 204. The lowered resolution also benefits translator 206, speeding up the process of finding optimal control parameters. In this regard, in embodiments described herein, emulator 204 allows for batch processing. Embodiments of emulator 204 are further described with respect to 108A of FIG. 1, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.

The translator 206 is generally configured to predict corresponding control parameters for various target outcomes utilizing data structures that are differentiable with respect to control parameters predicted by emulator 204. In embodiments, translator 206 can include rules, conditions, associations, models, algorithms, or the like to predict corresponding control parameters for various target outcomes. Translator 206 may take on different forms depending on the mechanism used to predict corresponding control parameters for various target outcomes. For example, translator 206 may comprise a language model, statistical model, fuzzy logic, neural network, finite state machine, support vector machine, logistic regression, clustering, or machine-learning techniques, similar statistical classification processes, or combinations of these to predict corresponding control parameters for various target outcomes.

Utilizing data structures that are differentiable with respect to control parameters predicted by emulator 204, translator 206 of the emulator-translator framework (e.g., emulator 204 and translator 206) can be trained to predict corresponding control parameters for various target outcomes (e.g., auto-tone, auto-color-recommendation, harmonization, relighting, exemplar-based style transfer, language/text-driven editing, shadow removal, etc.) for input images. In some embodiments, a task-specific research model (e.g., a model that generates images modified by for a target outcome) can be used to generate reference images in order to train the neural network of translator 206 to predict corresponding control parameters for the input image based on the reference image. In some embodiments, the task-specific research model is a language model. For example, a text-to-image diffusion model can be utilized to generate a reference image based on textual input of corresponding features into the text-to-image diffusion model.

In some embodiments, translator 206 can be trained to predict control parameters for a specific target outcome based on ground truth images of the target outcome, such as ground truth images with auto-tone, auto-color-recommendation, harmonization, relighting, exemplar-based style transfer, language/text-driven editing, shadow removal, etc. applied to the ground truth images. In some embodiments, the control parameter prediction can be performed in an iterative process in order to reduce the size of the neural network of translator 206. In some embodiments, the neural network of translator 206 can be trained to predict control parameters in a single-shot, as opposed to an iterative process, in order to increase the speed of translator 206. In some embodiments, translator 206 can be trained for local control parameter prediction, such as by predicting masks of an image and predicting control parameters for each mask of the image. The resolution of images can be lowered during training of translator 206 in order to optimize training of translator 206. Embodiments of translator 206 are further described with respect to 108B of FIG. 1, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.

The multi-threaded rendering engine 208 is generally configured to optimize rendering of video by allocating a thread for computing control parameters of video frames (e.g., through translator 206) and a thread for rendering the video frames based on the control parameters computed by the thread for computing control parameters (e.g., through emulator 204 or non-differentiable image processing software). In embodiments, multi-threaded rendering engine 208 can include rules, conditions, associations, models, algorithms, or the like to optimize rendering of video. Multi-threaded rendering engine 208 may take on different forms depending on the mechanism used to optimize rendering of video. For example, multi-threaded rendering engine 208 may comprise a language model, statistical model, fuzzy logic, neural network, finite state machine, support vector machine, logistic regression, clustering, or machine-learning techniques, similar statistical classification processes, or combinations of these to optimize rendering of video.

In some embodiments, multi-threaded rendering engine 208 allocates two threads running asynchronously to speed up the emulator's video rendering. In this regard, the first thread analyzes video frames to compute control parameters needed for rendering (e.g., through translator 206) and the second thread renders the frames using the current control parameters calculated from the first thread (e.g., through emulator 204 or non-differentiable image processing software). In this regard, in embodiments utilizing multi-threaded rendering engine 208, the division of the processing by multiple threads allows for parallel execution of rendering tasks. In some embodiments, the rendering of video by multi-threaded rendering engine 208 can be further optimized by including activating only a subset of operators (e.g., control parameters and/or masks predicted), reducing the input resolution (e.g., the video frame resolution is lowered for computing control parameters and/or rendering of video based on the processing speed required), running in batch (e.g., computing control parameters for a video frame to be applied to multiple video frames), only applying the adjustments to portions of each frame, reducing the model size for the translator 206, reducing the number of iterations of minimizing the loss function for control parameters prediction by translator 206, and/or etc.

Figure 3A:
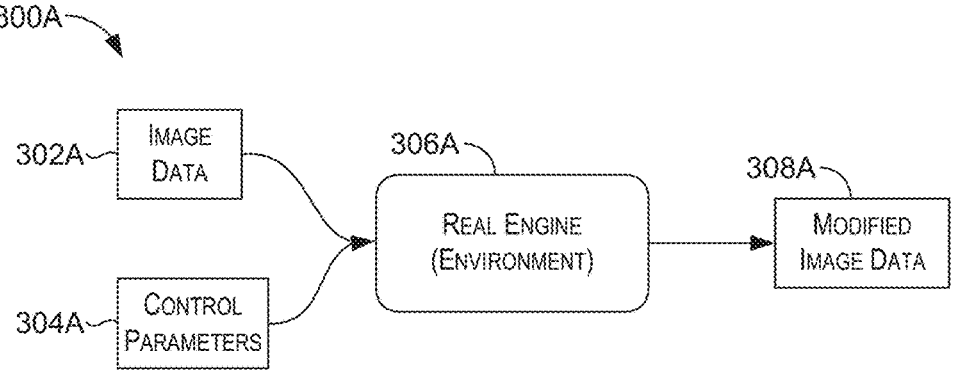
FIG. 3A provides an example diagram of non-differentiable image processing in which control parameters predicted by a translator can be implemented for non-destructive image and video editing, in accordance with embodiments of the present disclosure.

FIG. 3A provides an example diagram 300A of non-differentiable image processing in which control parameters predicted by a translator can be implemented for non-destructive image and video editing, in accordance with embodiments of the present disclosure. As shown in FIG. 3A, image data 302A, along with control parameters 304A are input into real engine 306A (e.g., non-differentiable image processing software) and real engine 306A outputs modified image data 308A. For example, a user adjusts control parameters that control visual attributes (e.g., exposure, contrast, temperature, etc.) and the visual attributes are applied to the image. In embodiments, a translator (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.) outputs control parameters 304A, which can be used by the real engine 306A to output the modified image data 308A. The modified image data 308A is non-differentiable with respect to the control parameters 304A and can be stored as meta-data for the image data 302A (e.g., non-destructive).

Figure 3B:
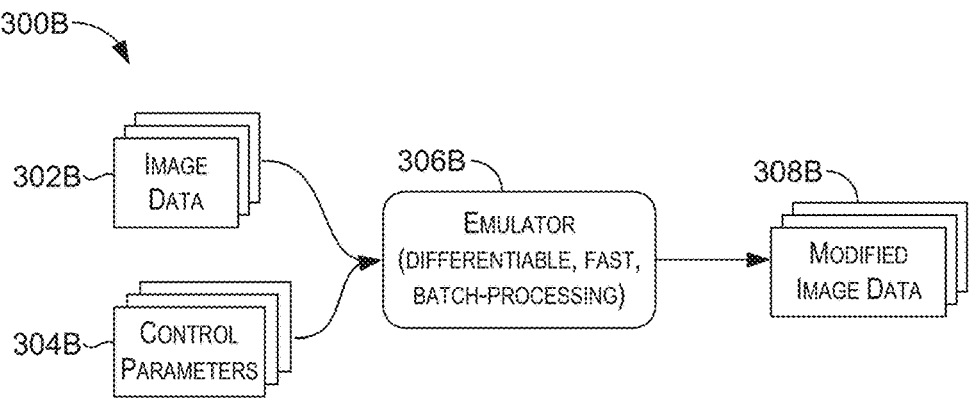
FIG. 3B provides an example diagram of an emulator for non-destructive image and video editing, in accordance with embodiments of the present disclosure.

FIG. 3B provides an example diagram 300B of an emulator for non-destructive image and video editing, in accordance with embodiments of the present disclosure. As shown in FIG. 3B, image data 302B, along with control parameters 304B are input into emulator 306B (e.g., 108A of FIG. 1, 204 of FIG. 2, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.). Emulator 306B outputs modified image data 308B in order to provide fast, batch-processable, differentiable emulation of the real engine (e.g., real engine 306A of FIG. 3). The modified image data 308B is differentiable with respect to the control parameters 304B and can be stored as metadata for the image data 302B (e.g., non-destructive). Further, as can be understood from FIG. 3B, any amount of control parameters 304B can be applied to any amount of single or batches of images of image data 302B to produce modified image data 308B.

Figure 3C:
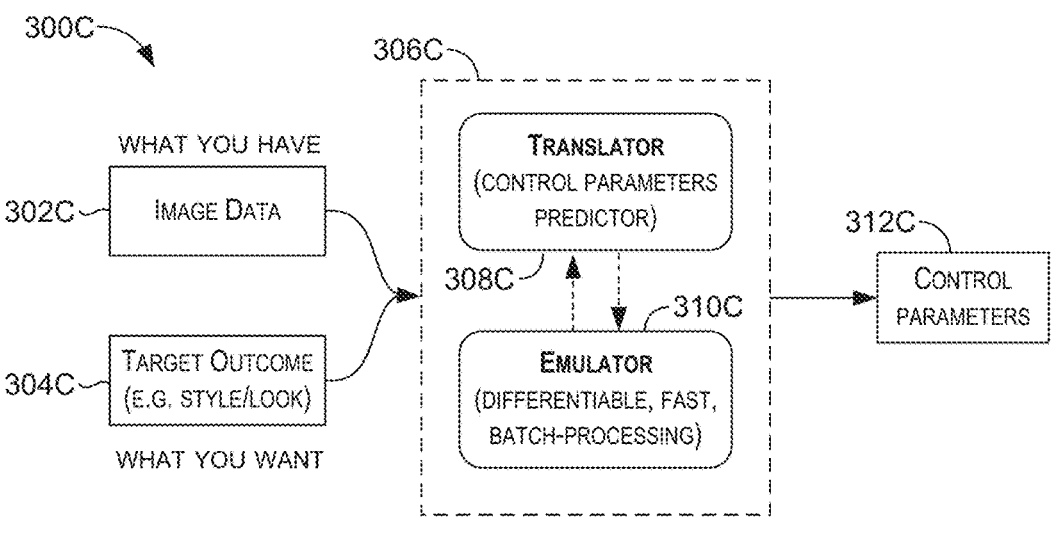
FIG. 3C provides an example diagram of an emulator-translator framework for control parameter prediction for non-destructive image and video editing, in accordance with embodiments of the present disclosure.

FIG. 3C provides an example diagram 300C of an emulator-translator framework for parameter prediction for non-destructive image and video editing, in accordance with embodiments of the present disclosure. As shown in FIG. 3C, image data 302C and the target outcome 304C are input into the emulator-translator framework 306C. For example, image data 302C may include one or more images or frames of video. Target outcome 304C may correspond to targeted style of a reference image as described in further detail with respect to FIGS. 4, 6A-6B, etc. Emulator-translator framework 306C includes a translator 308C (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.) to predict control parameters 312C based on target outcome 304C and/or input image data 302C. Translator 308C utilizes emulator 310C for prediction of control parameters and/or training of translator 308C for prediction of control parameters as the output of emulator 310C is differentiable with respect to the control parameters. The differentiable output of emulator 310C is described in further detail with respect to FIGS. 8A-8C, etc. In this regard, the emulator-translator framework 306C outputs control parameters 312C, which can be utilized by the emulator 310C or a real engine (e.g., real engine 306A of FIG. 3A). The control parameters 312C can then be displayed to an end user for viewing and adjusting to facilitate adjustable and explainable non-destructive image and video editing directly in the real engine or through the emulator 310C.

Figure 4:
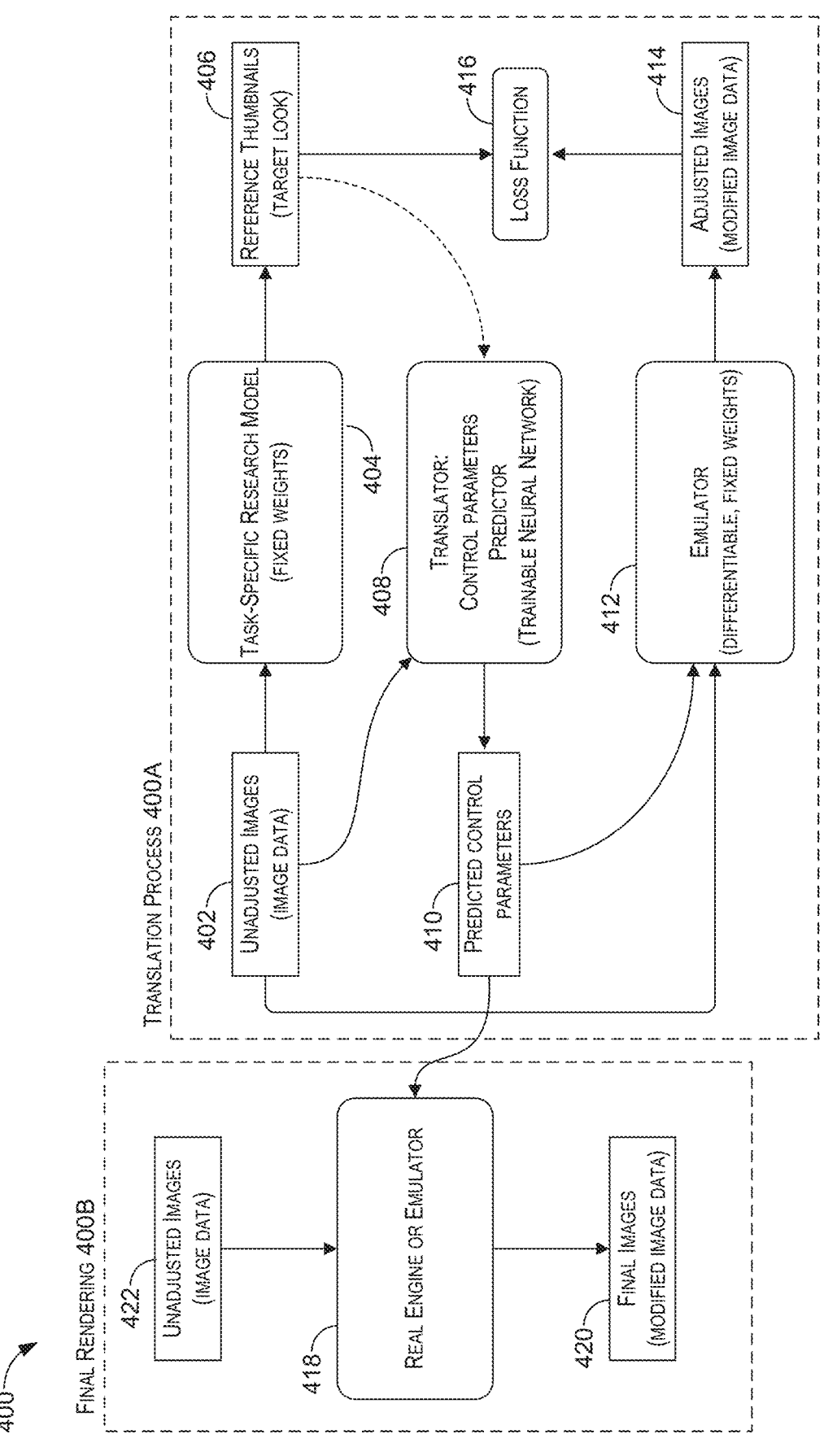
FIG. 4 provides an example diagram of iterative control parameter prediction through an emulator-translator framework for non-destructive image and video editing, in accordance with embodiments of the present disclosure.

FIG. 4 provides an example diagram 400 of iterative control parameter prediction through an emulator-translator framework for non-destructive image and video editing, in accordance with embodiments of the present disclosure. As shown in FIG. 4, an unadjusted image(s) 402 with corresponding image data is received by a task-specific research model 404. In some embodiments, unadjusted image(s) 402 is low-resolution image based on unadjusted images 422. The task-specific research model 404 generates a reference thumbnail(s) 406 (e.g., a low-resolution image) by applying a target look (e.g., target outcome) of the task-specific research model 404 to the unadjusted image(s) 402.

The task-specific research model 404 can be any algorithm that modifies an image for a target outcome, such as auto-tone, auto-color-recommendation, harmonization, relighting, exemplar-based style transfer, language/text-driven editing, shadow removal, etc. For example, with respect to language/text-driven editing, task-specific research model 404 can be a text-to-image diffusion model in order to generate reference thumbnail(s) 406 based on textual input into the text-to-image diffusion model.

In some embodiments, reference thumbnail 406 may be obtained from a photograph, frame of a video, or any image instead of being generated by task-specific research model 404. For example, a user may want to apply the style (e.g., visual attributes) of a movie to a desired image (e.g., unadjusted image 402, 422). In this regard, the user obtains a frame of the movie as reference thumbnail 406. In some embodiments, reference thumbnail 406 can be extended to other form of data besides images. For example, reference thumbnail 406 could be feature representations as long as the style/look can be measured quantitatively.

The unadjusted image(s) 402 is received by translator 408 (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.) to generate predicted control parameters 410. In some embodiments, reference thumbnail(s) 406 and the unadjusted image(s) 402 are received by translator 408 to generate predicted control parameters 410.

Emulator 412 (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) applies predicted control parameters 410 to unadjusted image(s) 402 to generate adjusted images 414 with modified image data with the corresponding predicted data structures that are differentiable with respect to the predicted control parameters 410.

Loss function 416 is determined by comparing adjusted image(s) 414 to the reference thumbnail(s) 406. The loss function 416 is then backpropagated into translator 408. The process of (1) generating predicted control parameters 410 by translator 408, (2) generating adjusted image(s) 414 by emulator 412 based on predicted control parameters 410, and (3) comparing the adjusted image(s) 414 to reference thumbnail(s) 406 is iterated to minimize loss function 416. In some embodiments, the resolution of the unadjusted image(s) 402, adjusted image(s) 414, and/or the reference thumbnail(s) 406 is lowered in order to optimize training of translator 408. For example, the resolution of unadjusted image(s) 422 is lowered to a lower resolution of unadjusted image(s) 402 before unadjusted image(s) 402 are received by translator 408 and/or task-specific research model 404 to generate predicted control parameters 410 and/or the reference thumbnail(s) 406.

Following optimization of the predicted control parameters 410 by minimizing loss function 416, the predicted control parameters 410 and the input unadjusted image(s) 422 (e.g., the full-resolution input unadjusted images 422) are received by real engine (e.g., non-differentiable image processing software) or emulator 412 in block 418 to generate final image(s) 420 with modified image data in full resolution. Final image(s) 420, along with predicted control parameters 410, can be displayed and/or adjusted through the real engine or emulator 412 in block 418. In this regard, the emulator-translator framework (e.g., translator 408 and emulator 412) facilitates adjustable and explainable non-destructive image and video editing in an efficient and effective manner through iterative control parameter prediction.

Figure 5:
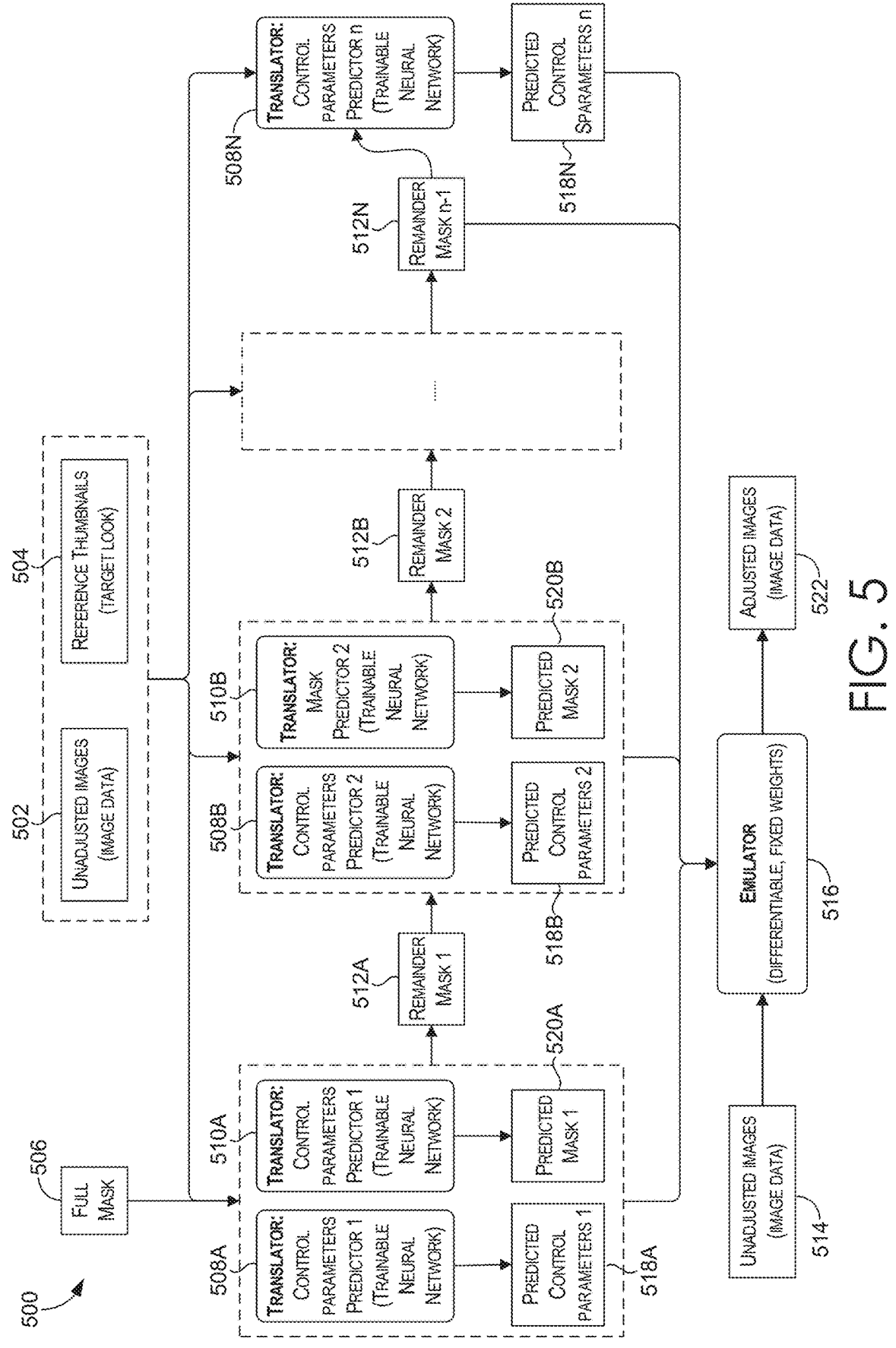
FIG. 5 provides an example diagram of local control parameter prediction through an emulator-translator framework for non-destructive image and video editing, in accordance with embodiments of the present disclosure.

FIG. 5 provides an example diagram 500 of local control parameter prediction through an emulator-translator framework for non-destructive image and video editing, in accordance with embodiments of the present disclosure. As shown in FIG. 5, unadjusted image(s) 502 (e.g., unadjusted image(s) 402 of FIG. 4, unadjusted image(s) 602B of FIG. 6B, etc.) and reference thumbnails 504 with a target look (e.g., reference thumbnail 406 of FIG. 4, reference thumbnail(s) 604B of FIG. 6B, etc.) for prediction of a full mask 506. Mask prediction framework 506 may include translators 508A, 508B, 508N for control parameters predictions 518A, 518B, 518N and translators 510A, 510B for mask predictions 520A, 520B in order to generate masks with corresponding control parameters for each mask. Translators are described in further detail with respect to 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.

In the example shown in FIG. 5, translator 510A predicts predicted mask 520A based on input unadjusted image(s) 502A and reference thumbnail(s) 504. Translator 508A predicts control parameters 518A for the predicted mask 520B. The initial remainder mask 512A (e.g., the predicted mask 520A subtracted from the full mask 506) is then received by translator 510B to predict the next mask (e.g., predicted mask 2 520B) and translator 508B to predict the control parameters for the next mask (e.g., predicted control parameters 2 518B). The next remainder mask 512B (e.g., predicted mask 520A and predicted mask 520B subtracted from full mask 506) in order to repeat the process for the prediction of any amount of masks and corresponding parameters for each mask. The final remainder mask 512N is then received by translator 508N to predict the predicted control parameters 518N for the final remainder mask 512N. The predicted masks 520A, 520B, final remainder mask 512N, and the predicted control parameters for each mask (e.g., 518A, 518B, 518N) are received by emulator 516. Emulator 516 generates adjusted images 522 (e.g., adjusted image(s) 414 or final images 420 of FIG. 4, adjusted image(s) 612B of FIG. 6B, etc.) based on unadjusted images 514 (e.g., unadjusted image(s) 402 or 422 of FIG. 4, unadjusted image(s) 602B of FIG. 6B, etc.) and the pre-dicted masks 520A, 520B, final remainder mask 512N, and the predicted control parameters for each mask (e.g., 518A, 518B, 518N). Although three (3) masks with corresponding control parameters for each mask are shown in FIG. 5, any amount of masks with corresponding control parameters for each mask are with the scope of the embodiments described herein.

In embodiments, the mask prediction of FIG. 5 can be performed as a part of the iterative process of FIG. 4. For example, the process of (1) generating predicted control parameters 410 by translator 408, (2) generating adjusted image(s) 414 by emulator 412 based on predicted control parameters 410, and (3) comparing the adjusted image(s) 414 to reference thumbnail(s) 406 is iterated to minimize loss function 416 may include any amount of translators 508A-N and 514 for control parameters predictions and translators 510A-N for mask prediction of FIG. 5 in order to generate masks with corresponding control parameters for each mask within predicted control parameters 410 of FIG. 4.

Figures 6A, 6B:
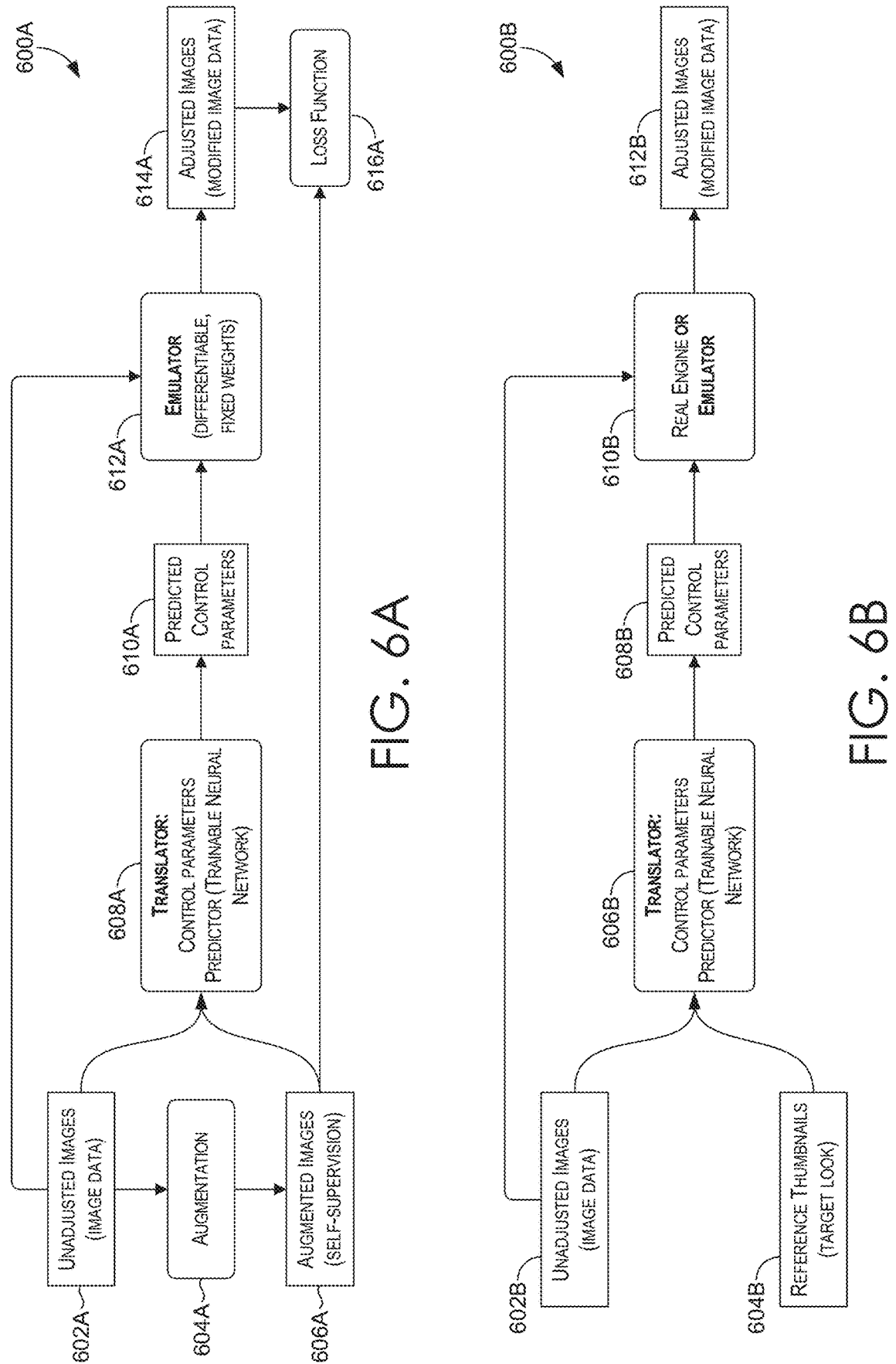
FIG. 6A provides an example diagram of training a translator for single-shot control parameter prediction through an emulator-translator framework for non-destructive image and video editing, in accordance with embodiments of the present disclosure.
FIG. 6B provides an example diagram of single-shot control parameter prediction by a translator for non-destructive image and video editing, in accordance with embodiments of the present disclosure.

FIG. 6A provides an example diagram 600A of training a translator for single-shot control parameter prediction through an emulator-translator framework for non-destruc-tive image and video editing, in accordance with embodi-ments of the present disclosure. As shown in FIG. 6A, unadjusted image(s) 602A with image data are augmented through augmentation 604A to generate augmented images 606A. In embodiments, augmentation 604A can be per-formed through a task-specific research model as described with respect to FIG. 4. The unadjusted image(s) 602A and augmented images 606A are received by translator 608A (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.) to predict control parameters 610A based on the unadjusted image(s) 602A and augmented images 606A. Emulator 612A (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) applies predicted control parameters 610A to unad-justed image(s) 602A to generate adjusted images 614A with modified image data with the corresponding predicted data structures that are differentiable with respect to the predicted control parameters 610A.

Loss function 616A is determined by comparing adjusted image(s) 614A to the augmented images(s) 606A for single-shot control parameter prediction. The loss function 616A is then backpropagated into translator 608A in order to train translator 608A. In some embodiments, the resolution of the unadjusted image(s) 602A, adjusted image(s) 614A, and/or the augmented image(s) 606A is lowered in order to opti-mize training of translator 608A.

FIG. 6B provides an example diagram 600B of single-shot control parameter prediction by a translator for non-destructive image and video editing, in accordance with embodiments of the present disclosure. After the translator 606B is trained (e.g., as described with respect to translator 608A of FIG. 6A), translator 606B generates predicted control parameters 608B based on unadjusted image(s) 602B with image data and reference thumbnail(s) 604B with a target look. In embodiments, reference thumbnail(s) 604B can be obtained and/or generated in any manner as described with respect to reference thumbnail 406 of FIG. 4.

The real engine (e.g., non-differentiable image processing software) or emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) of block 610B applies predicted control parameters 608B to unadjusted image(s) 602B to generate adjusted images 612B with modified image data with the corresponding predicted data structures that are differentiable with respect to the predicted control param-eters. In embodiments, the single shot control parameter prediction of FIG. 6B can be performed instead of the iterative process of FIG. 4. In embodiments, single shot control parameter prediction of FIG. 6B can include any amount of translators for mask prediction and predicted control parameters for each mask of FIG. 5.

Figure 7A:
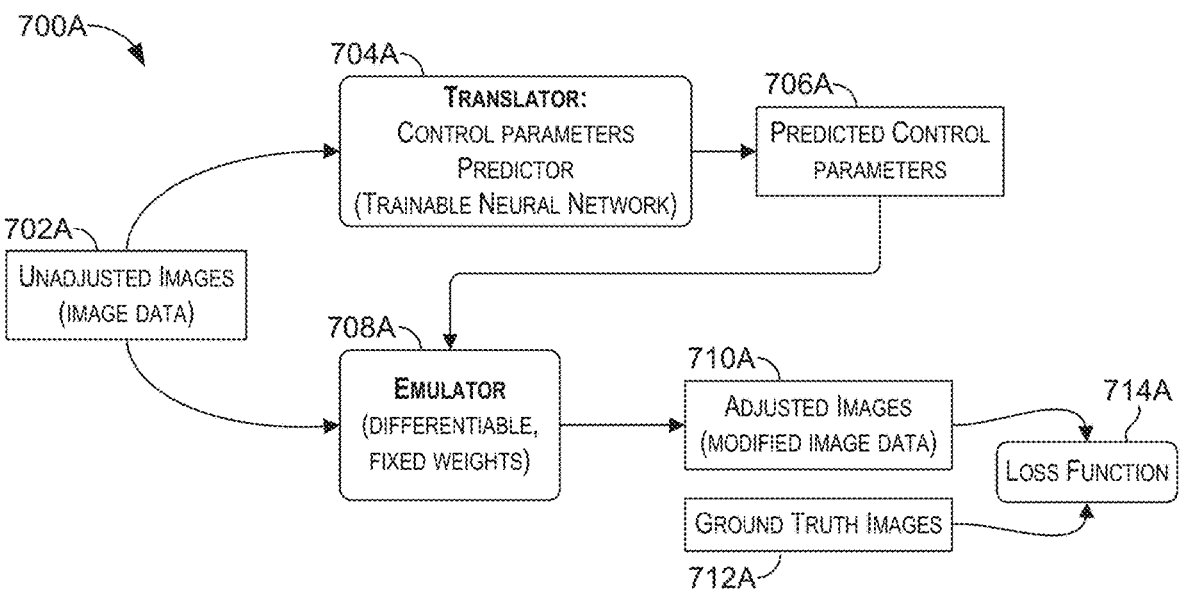
FIG. 7A provides an example diagram of training a translator for task-specific control parameter prediction through an emulator-translator framework for non-destructive image and video editing, in accordance with embodiments of the present disclosure.

FIG. 7A provides an example diagram 700A of training a translator for task-specific control parameter prediction through an emulator-translator framework for non-destruc-tive image and video editing, in accordance with embodi-ments of the present disclosure. As shown in FIG. 7A, unadjusted image(s) 702A are received by translator 704A (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.) to predict control parameters 706A based on the unadjusted image(s) 702A for a specific task. Emulator 708A (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) applies predicted control parameters 706A to unadjusted image(s) 702A to generate adjusted images 710A with modified image data with the corresponding predicted data structures that are differentiable with respect to the predicted control parameters.

Loss function 714A is determined by comparing adjusted image(s) 710A to the ground truth images(s) 712A. The ground truth image(s) 712A are images with the specific task applied outcomes (e.g., auto-tone, auto-color-recommendation, harmonization, relighting, exemplar-based style transfer, language/text-driven editing, shadow removal, etc.). In this regard, the translator 704A learns the specific task based on the corresponding ground truth image(s) 712A. The loss function 714A is then backpropagated into translator 704A in order to train translator 704A. In some embodiments, the resolution of the unadjusted image(s) 702A, adjusted image (s) 710A, and/or the ground truth image(s) 712A is lowered in order to optimize training of translator 704A.

Figure 7B:
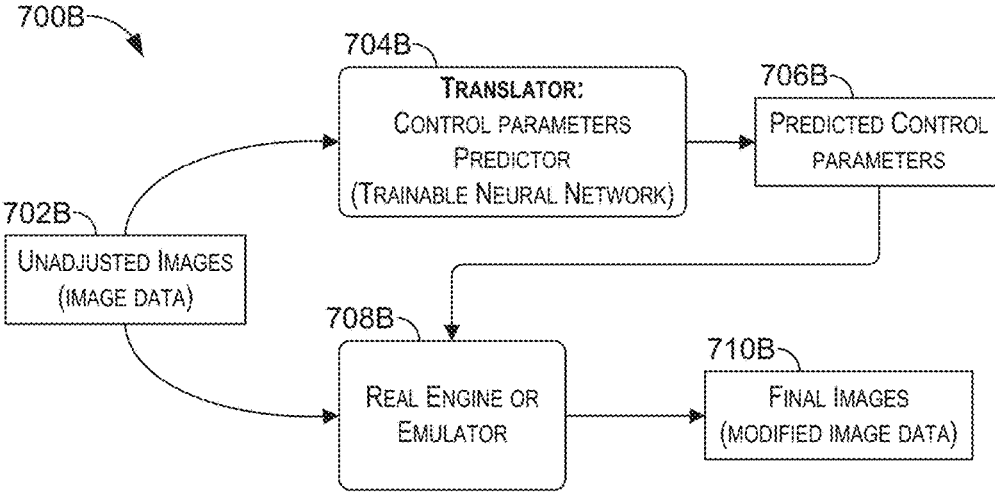
FIG. 7B provides an example diagram of task-specific control parameter prediction by a translator for non-destructive image and video editing, in accordance with embodiments of the present disclosure.

FIG. 7B provides an example diagram 700B of task-specific control parameter prediction by a translator for non-destructive image and video editing, in accordance with embodiments of the present disclosure. After the translator 704B is trained for the specific task (e.g., as described with respect to translator 704A of FIG. 7A), translator 704B generates predicted control parameters 706B based on unadjusted image(s) 702B with image data based on the specific task. For example, a user selects a specific task outcomes (e.g., auto-tone, auto-color-recommendation, harmonization, relighting, exemplar-based style transfer, language/text-driven editing, shadow removal, etc.) to edit a selected image (e.g., a photo or frame(s) of a video) and the translator 704B receives the selected task and selected image 702B to generate predicted control parameters 706B.

The real engine (e.g., non-differentiable image processing software) or emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) of block 708B applies predicted control parameters 706B to unadjusted image(s) 702B to generate final images 710B with modified image data with the corresponding predicted data structures that are differentiable with respect to the predicted control parameters. In embodiments, control parameter prediction of FIG. 7B can include any amount of translators for mask prediction and predicted control parameters for each mask of FIG. 5.

Figure 8A:
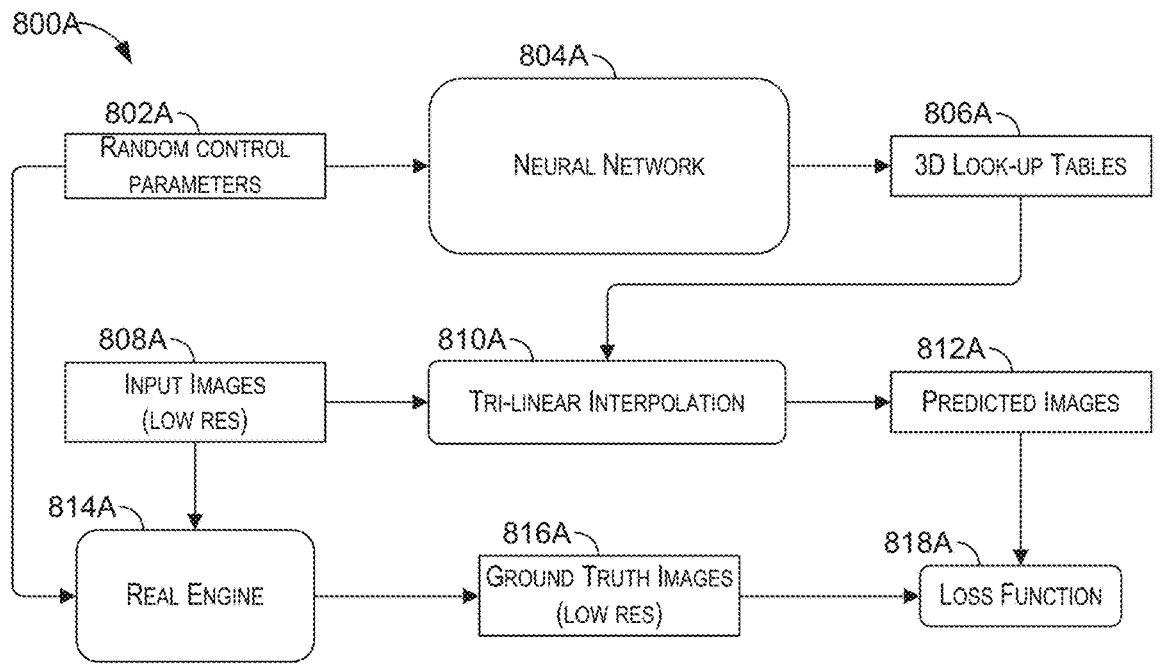
FIG. 8A provides an example diagram of training a neural network of an emulator to predict 3D LUTs for non-destructive image and video editing, in accordance with embodiments of the present disclosure.

FIG. 8A provides an example diagram 800A of training a neural network of an emulator to predict 3D LUTs for non-destructive image and video editing, in accordance with embodiments of the present disclosure. As shown in FIG. 8A, a neural network 804A (e.g., a transformer model, a CNN, etc.) of an emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) receives input control parameters 802A for real engine 814A (e.g., non-differentiable image processing software). In some embodiments, the input control parameters 802A are randomly generated. The neural network 804A of the emulator predicts 3D LUT(s) 806A based on the input control parameters 802A where the 3D LUT(s) are differentiable with respect to the input control parameters 802A.

Tri-linear interpolation 810A is applied to input images 808A based on the predicted 3D LUT 806A in order to generate predicted images 812A. The input control parameters 802A and the input images 808A are received by real engine 814A to generate ground truth images 816A. In some embodiments, the resolution of the input images 808A and/or the generated ground truth images 816A is lowered in order to optimize (e.g., speed up processing due to the smaller size of the lower resolution image) training of the neural network 804A of the emulator.

Loss function 818A is determined by comparing the predicted images 812A to the ground truth images 816A. The loss function 818A is backpropagated into the neural network 804A of the emulator in order to adjust the corresponding weights of the neural network 804A. The process of generating input control parameters 802A to predict 3D LUTs 806A, comparing the predicted images 812A to the ground truth images generated from the input control parameters 802A, and minimizing the loss function 818A is iterated until the neural network 804A of the emulator is trained. In this regard, the 3D LUT predicted by the neural network 804A of the emulator are differentiable with respect to the control parameters 802A of real engine 814A.

Figure 8B:
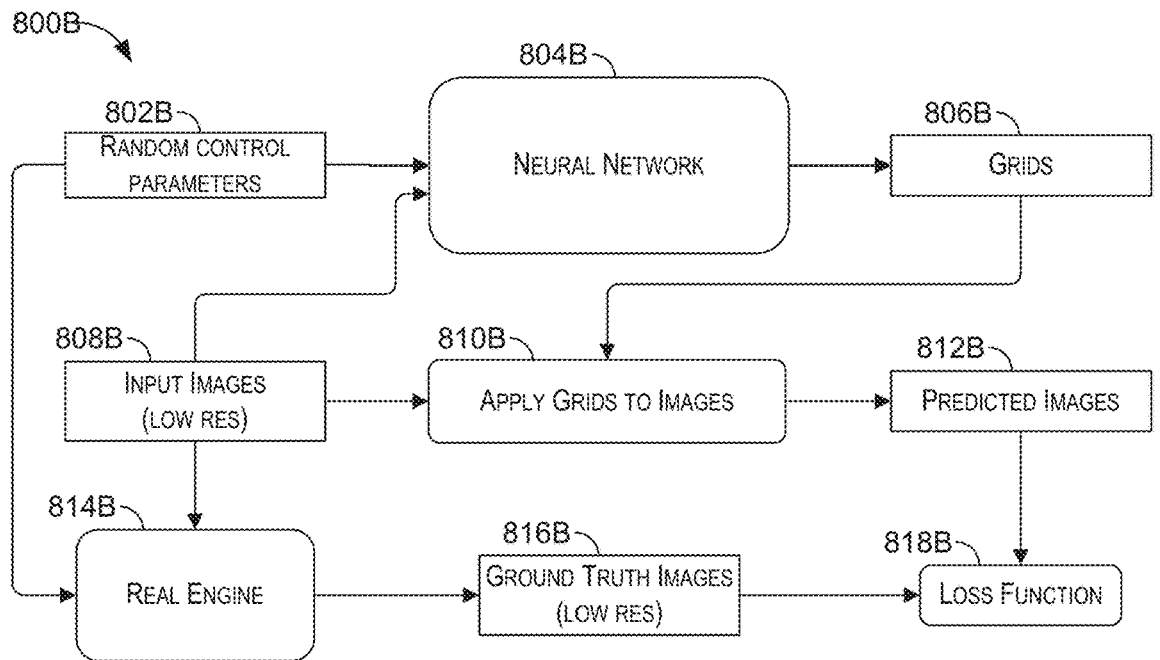
FIG. 8B provides an example diagram of training a neural network of an emulator to predict bilateral grids for non-destructive image and video editing, in accordance with embodiments of the present disclosure.

FIG. 8B provides an example diagram 800B of training a neural network of an emulator to predict bilateral grids for non-destructive image and video editing, in accordance with embodiments of the present disclosure. As shown in FIG. 8B, a neural network 804B (e.g., a transformer model, a CNN, etc.) of an emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) receives input images 808B and input control parameters 802B for real engine 814B (e.g., non-differentiable image processing software). In some embodiments, the input control parameters 802B are randomly generated. The neural network 804B of the emulator predicts bilateral grid(s) 806B based on the input images 808B and the input control parameters 802B where the bilateral grid(s) are differentiable with respect to the input control parameters 802B.

Bilateral filtering 810B is applied to input images 808B based on the predicted bilateral grids 806B in order to generate predicted images 812B. The input control parameters 802B and the input images 808B are received by real engine 814B to generate ground truth images 816B. In some embodiments, the resolution of the input images 808B and/or the generated ground truth images 816B is lowered in order to optimize training of the neural network 804B of the emulator.

Loss function 818B is determined by comparing the predicted images 812B to the ground truth images 816B. The loss function 818B is backpropagated into the neural network 804B of the emulator in order to adjust the corresponding weights of the neural network 804B. The process of generating input control parameters 802B to predict bilateral grids 806B, comparing the predicted images 812B to the ground truth images generated from the input control parameters 802B, and minimizing the loss function 818B is iterated until the neural network 804B of the emulator is trained. In this regard, the bilateral grids predicted by the neural network 804B of the emulator are differentiable with respect to the control parameters 802B of real engine 814B.

Figure 8C:
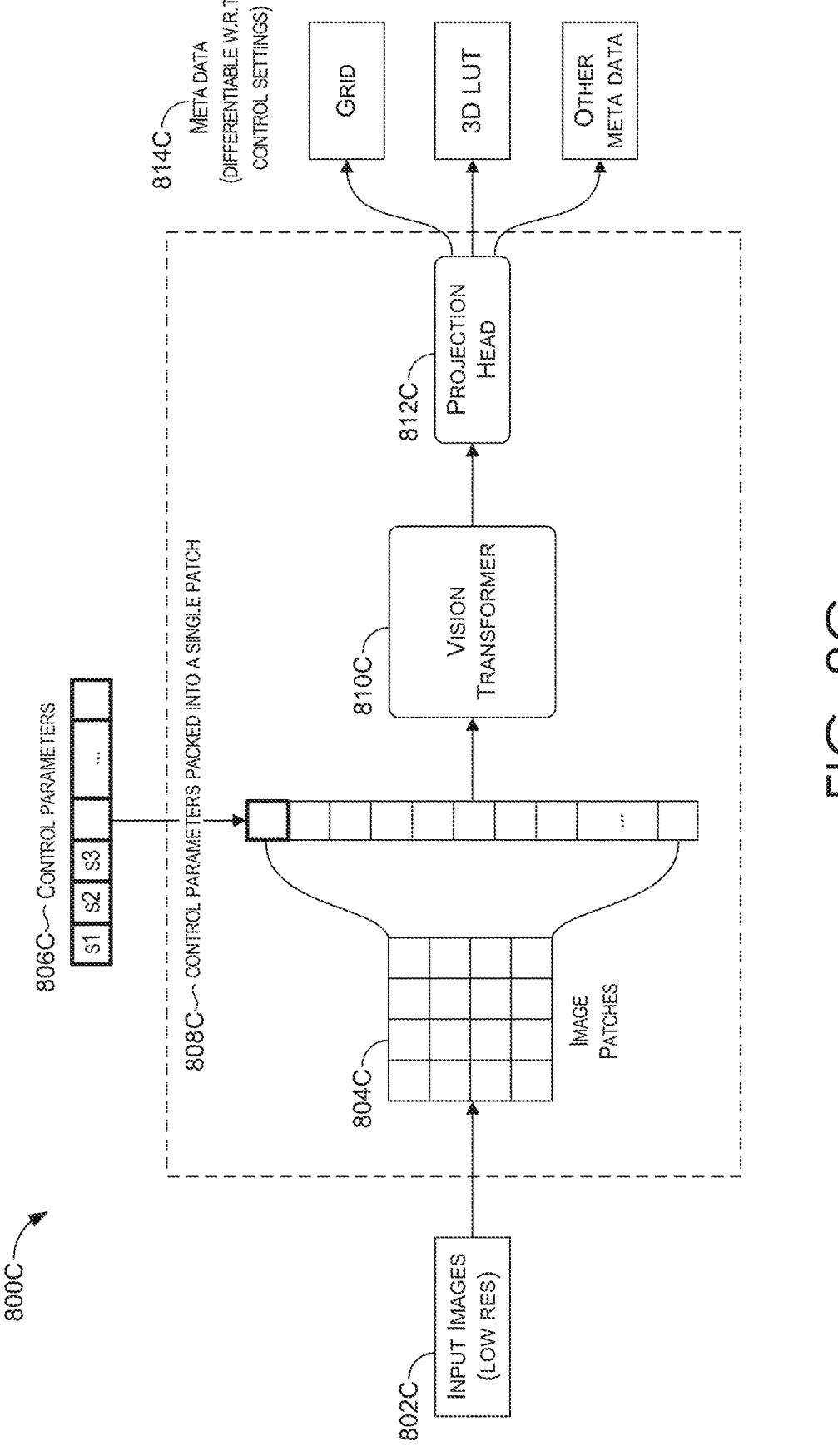
FIG. 8C provides an example diagram of a neural network of an emulator for non-destructive image and video editing, in accordance with embodiments of the present disclosure.

FIG. 8C provides an example diagram 800C of a neural network of an emulator for non-destructive image and video editing, in accordance with embodiments of the present disclosure. As shown in FIG. 8C, an input image(s) 802C is input into the neural network (e.g., neural network 804A of FIG. 8A, neural network 804B of FIG. 8B, etc.) of an emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.). The images are algorithmically cut into image patches 804C. Image patches 804C can be any amount of pixels of input image 802C. Control parameters 806C and image patches 804C are input as vector 808C into vision transformer (ViT) 810C. ViT 810C determines a sequence of embeddings from vector 808C (e.g., image patches 804C and control parameters 806C), which are processed through transformer layers to capture relationships between the image patches 804C and control parameters 806C of vector 808C.

In embodiments, after self-attention layers and feed-forward layers of ViT 810C process vector 808C, projection head 812C transforms the learned representations of vector 808C into the output of metadata 814C. Projection head 812C can include one or more linear layers and/or non-linear activation functions in order to transform the learned representations into the output metadata 814C. As described with respect to FIGS. 1-8C, metadata 814C is differentiable with respect to the control parameters 806C and can be represented by bilateral grids, 3D LUTs, or any other metadata. In this regard, the emulator outputs metadata that is differentiable with respect to control parameters of image processing software, is fast, and can run in batches.

With reference now to FIGS. 9-13, FIGS. 9-13 provide method flows related to facilitating using differentiable emulation of non-differentiable image processing for non-destructive image and video editing, in accordance with embodiments of the present technology. Each block of method 900, 1000, 1100, 1200 and 1300 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 9-13 are exemplary only and not intended to be limiting. As can be appreciated, in some embodiments, method flows 900-1300 can be implemented, at least in part, to facilitate using generative AI to optimize product search query results.

Turning now to FIG. 9, a flow diagram is provided showing an embodiment of a method 900 for training a neural network of an emulator for non-destructive image and video editing, in accordance with embodiments described herein. Initially, at block 902, a neural network (e.g., a transformer model) of an emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) receives input control parameters for non-differentiable image processing software and/or input training images. In some embodiments, the input control parameters are randomly generated. In some embodiments, only input control parameters are received (e.g., no input training images are received) during training when the neural network to predict a 3D LUT based on the input control parameters. In some embodiments, input control parameters and input training images are received during training the neural network to predict a bilateral grid based on the input control parameters.

At block 904, the neural network of the emulator predicts data structure(s) (e.g., a 3D LUT, a bilateral grid, etc.) based on the input control parameters and/or input training images where the data structure(s) are differentiable with respect to the input control parameters. In some embodiments, the neural network of the emulator predicts a 3D LUT only based on input control parameters (e.g., without receiving input training images). In some embodiments, the neural network of the emulator predicts a bilateral grid based on both the input control parameters and input training images. In some embodiments, the neural network of the emulator predicts other metadata based on both the input control parameters and/or input training images.

At block 906, a corresponding algorithm (e.g., tri-linear interpolation, bilateral filtering, etc.) is applied to input images based on the data structure predicted (e.g., a 3D LUT, a bilateral grid, other metadata, etc.) in order to generate predicted images. In some embodiments, the resolution of the input images is lowered in order to optimize training of the neural network of the emulator.

At block 908, the input control parameters and the input training images are received by the non-differentiable image processing software to generate ground truth images. In some embodiments, the resolution of the ground truth images is lowered in order to optimize training of the neural network of the emulator.

At block 910, the loss function is determined by comparing the predicted images of block 906 to the ground truth images of block 908. At block 912, the loss function is backpropagated into the neural network of the emulator in order to adjust the corresponding weights of the neural network. At block 914, the process of block 902 through 912 is iterated until the neural network of the emulator is trained. In this regard, the data structures (e.g., a 3D LUT, a bilateral grid, etc.) predicted by the neural network of the emulator are differentiable with respect to the control parameters of the non-differentiable image processing software.

Turning now to FIG. 10, a flow diagram is provided showing an embodiment of a method 1000 training a neural network of a translator for non-destructive image and video editing, in accordance with embodiments described herein. Initially, at block 1002, a neural network (e.g., a machine learning model) of a translator (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.) receives input unadjusted images as training images. In embodiments, a set of images can be obtained that includes a number of unadjusted images as training images and a number of corresponding adjusted images as ground truth training images. Each unadjusted images in the set of images includes a corresponding adjusted training image with the specific task/outcome applied (e.g., auto-tone, auto-color-recommendation, harmonization, relighting, exemplar-based style transfer, language/text-driven editing, shadow removal, etc.). For example, an unadjusted image would be the image before the auto-tone is applied and each corresponding adjusted image would be the image after the auto-tone is applied. The specific task applied can be applied by any model, algorithm, software, etc. to generate the ground truth images.

At block 1004, the translator predicts control parameters based on the unadjusted training images and the specific task. At block 1006, the emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) receives the predicted control parameters and the unadjusted training images to generate adjusted images based on the predicted control parameters. At block 1008, the ground truth images with the specific task applied are received. At block 1010, the loss function is determined by comparing the adjusted images of block 1006 to the ground truth images of block 1008. At block 1012, the loss function is backpropagated into the neural network of the translator in order to adjust the corresponding weights of the neural network. At block 1014, the process of block 1002 through 1012 is iterated until the neural network of translator is trained to perform the specific task.

Figure 11:
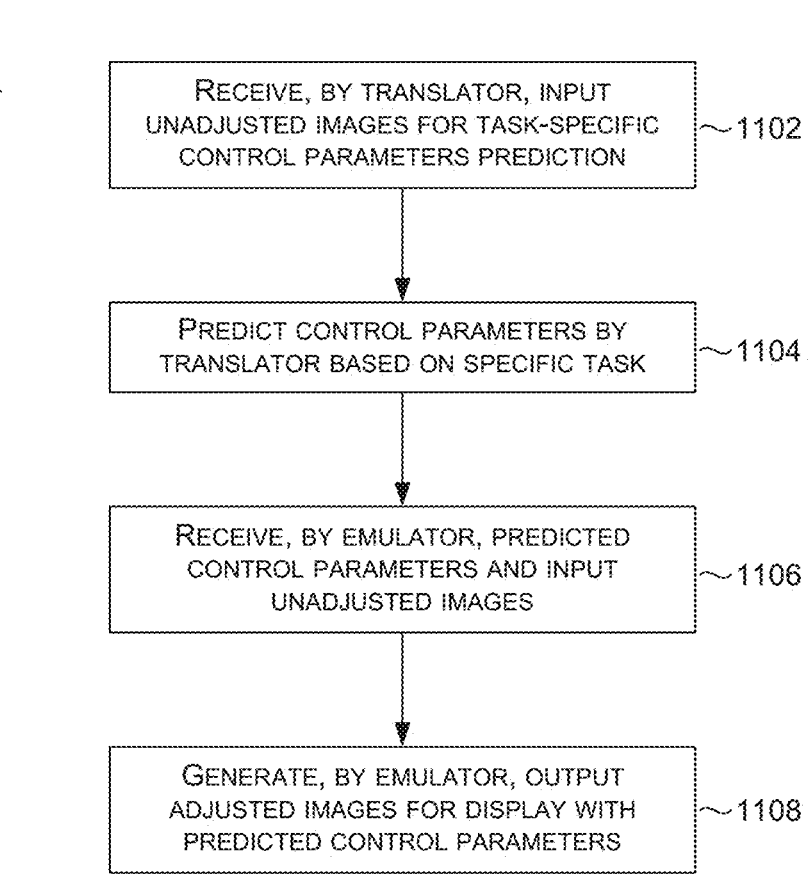
FIG. 11 provides an example flow diagram of task-specific control parameter prediction for non-destructive image and video editing, in accordance with embodiments of the present disclosure.

Turning now to FIG. 11, a flow diagram is provided showing an embodiment of a method 1100 for task-specific control parameter prediction for non-destructive image and video editing, in accordance with embodiments described herein. Initially, at block 1102, input unadjusted image(s) are received by the trained neural network (e.g., machine learning model) of a translator (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.) for task-specific control parameter prediction. For example, a user selects a specific task/outcome (e.g., auto-tone, auto-color-recommendation, harmonization, relighting, exemplar-based style transfer, language/text-driven editing, shadow removal, etc.) to edit a selected image (e.g., a photo or frame(s) of a video) and the translator receives the selected task and selected image.

At block 1104, the translator predicts control parameters based on the input unadjusted image(s) and the corresponding task. At block 1106, the emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) receives the predicted control parameters and the unadjusted image(s) to generate corresponding output adjusted image(s) based on the predicted control parameters at block 1108. In some embodiments, as the translator is trained to predict control parameters for the non-differentiable image processing software (e.g., trained through the use of the emulator), the non-differentiable image processing software receives the predicted control parameters and the unadjusted image(s) directly to generate corresponding output adjusted image(s) based on the predicted control parameters. The output adjusted images with the corresponding predicted control parameters can then be displayed to an end user through the emulator or through the non-differentiable image processing software.

Turning now to FIG. 12, a flow diagram is provided showing an embodiment of a method 1200 for iterative control parameter prediction through an emulator-translator framework for non-destructive image and video editing, in accordance with embodiments described herein. Initially, at block 1202, an input unadjusted image(s) is received by a reference image generator to generate a reference image(s). In some embodiments, the reference image generator is a task-specific research model that edits images based on corresponding algorithms employed by the research model. In some embodiments, the reference image is generated by language model. For example, a text-to-image diffusion model can be utilized to generate a reference image based on textual input of corresponding features into the text-to-image diffusion model. In some embodiments, a reference image is obtained from a photograph, frame of a video, or any image in order to translate the image to a set of predicted control parameters by the translator. For example, a user may want to apply the style (e.g., visual attributes) of a movie to a desired image. In this regard, the user obtains a frame of the movie as a reference image.

At block 1204, the input unadjusted image(s) is received by the neural network (e.g., machine learning model) of the translator (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG.

7B, etc.) to generate predicted control parameters. At block 1206, the predicted control parameters and input unadjusted image are received by the emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) in order to generate an adjusted image(s) based on the predicted control parameters. At block 1208, the loss function is determined by comparing the adjusted image(s) of block 1206 to the reference image(s) of block 1202. The loss function is then backpropagated into the neural network of the translator. At block 1210, the process of block 1204 through 1208 is iterated to optimize the output predicted control parameters of the translator by minimizing the loss function (e.g., minimizing the differences between the reference image(s) and the adjusted image(s)). In some embodiments, the resolution of the input unadjusted image(s) and/or the reference image(s) is lowered in order to optimize training of the neural network of the translator.

At block 1212, the predicted control parameters, as optimized at block 1210, and the input unadjusted image(s) is received by the emulator. At block 1214, the emulator generates corresponding output adjusted image(s) based on the predicted control parameters and the input unadjusted image(s). In some embodiments, as the translator predicts control parameters for the non-differentiable image processing software (e.g., trained through the use of the emulator), the non-differentiable image processing software receives the predicted control parameters and the unadjusted image (s) directly to generate corresponding output adjusted image (s) based on the predicted control parameters. The output adjusted images with the corresponding predicted control parameters can then be displayed to an end user through the emulator or through the non-differentiable image processing software.

Turning now to FIG. 13, a flow diagram is provided showing an embodiment of a method 1300 for local control parameter prediction through an emulator-translator framework for non-destructive image and video editing, in accordance with embodiments described herein. Initially, at block 1302, an input unadjusted image(s) are received by a neural network (e.g., a machine learning model) of a translator (e.g., 108B of FIG. 1, 206 of FIG. 2, 308C of FIG. 3C, 408 of FIG. 4, 508A, 508B and 514 of FIG. 5, 608A of FIG. 6A, 606B of FIG. 6B, 704A of FIG. 7A, 704B of FIG. 7B, etc.) to generate predictions of one or more masks and a corresponding set predicted control parameters for each mask. For example, the translator can predict a mask with a predicted set of control parameters for a portion of an image and a predicted set of control parameters for the remainder of the image. Any amount of masks, each mask with its own corresponding set of predicted control parameters, are within the scope of the present disclosure.

At block 1304, the predicted mask(s), with the corresponding predicted control parameters of each mask, and the input unadjusted image(s) are received by the emulator (e.g., 108A of FIG. 1, 204 of FIG. 2, 306B of FIG. 3B, 310C of FIG. 3C, 412 and/or 418 of FIG. 4, 522 of FIG. 5, 612A of FIG. 6A, 610B of FIG. 6B, 708A of FIG. 7A, 708B of FIG. 7B, 804A of FIG. 8A, 804B of FIG. 8B, FIG. 8C, etc.) in order to generate an adjusted image(s) based on the predicted mask(s) and the corresponding predicted control parameters of each mask (and corresponding predicted control parameters of the remainder of the image not subject to the mask(s)). At block 1306, the loss function is determined by comparing the adjusted image(s) of block 1306 to ground truth images. The loss function is then backpropagated into the neural network of the translator. In embodiments, a set of images can be obtained that includes a number of unadjusted images as training images and a number of corresponding adjusted images as ground truth training images. Each of the unadjusted images in the set of images includes a corresponding adjusted training image with one or more masks, and each mask with a corresponding set of control parameters to the portion of the image of the mask. For example, an adjusted image would be the image before the mask(s) and corresponding control parameters of each mask are applied and each corresponding adjusted image would be the image after the mask(s) and corresponding control parameters of each mask are applied. In some embodiments, the resolution of the input unadjusted and ground truth images is lowered in order to optimize training of the neural network of the translator.

At block 1308, the process of block 1302 through 1306 is iterated to optimize the output predicted masks and corresponding predicted control parameters of each mask by the neural network of the translator by minimizing the loss function (e.g., minimizing the differences between the ground truth image(s) and the adjusted image(s)).

At block 1310, after training of the neural network of the translator, the trained translator receives unseen, unadjusted images as input and predicts one or more mask(s) and corresponding control parameters for each mask and/or remainder of the image that is not subject to the mask. At block 1312, the emulator generates corresponding output adjusted image(s) based on the predicted masks/control parameters. In some embodiments, as the translator predicts masks/control parameters for the non-differentiable image processing software (e.g., trained through the use of the emulator), the non-differentiable image processing software receives the predicted masks/control parameters and the unadjusted image(s) directly to generate corresponding output adjusted image(s) based on the predicted masks/control parameters. The output adjusted images with the corresponding predicted masks/control parameters can then be displayed to an end user through the emulator or through the non-differentiable image processing software.

Having briefly described an overview of aspects of the technology described herein, an exemplary operating environment in which aspects of the technology described herein may be implemented is described below in order to provide a general context for various aspects of the technology described herein.

Figure 14:
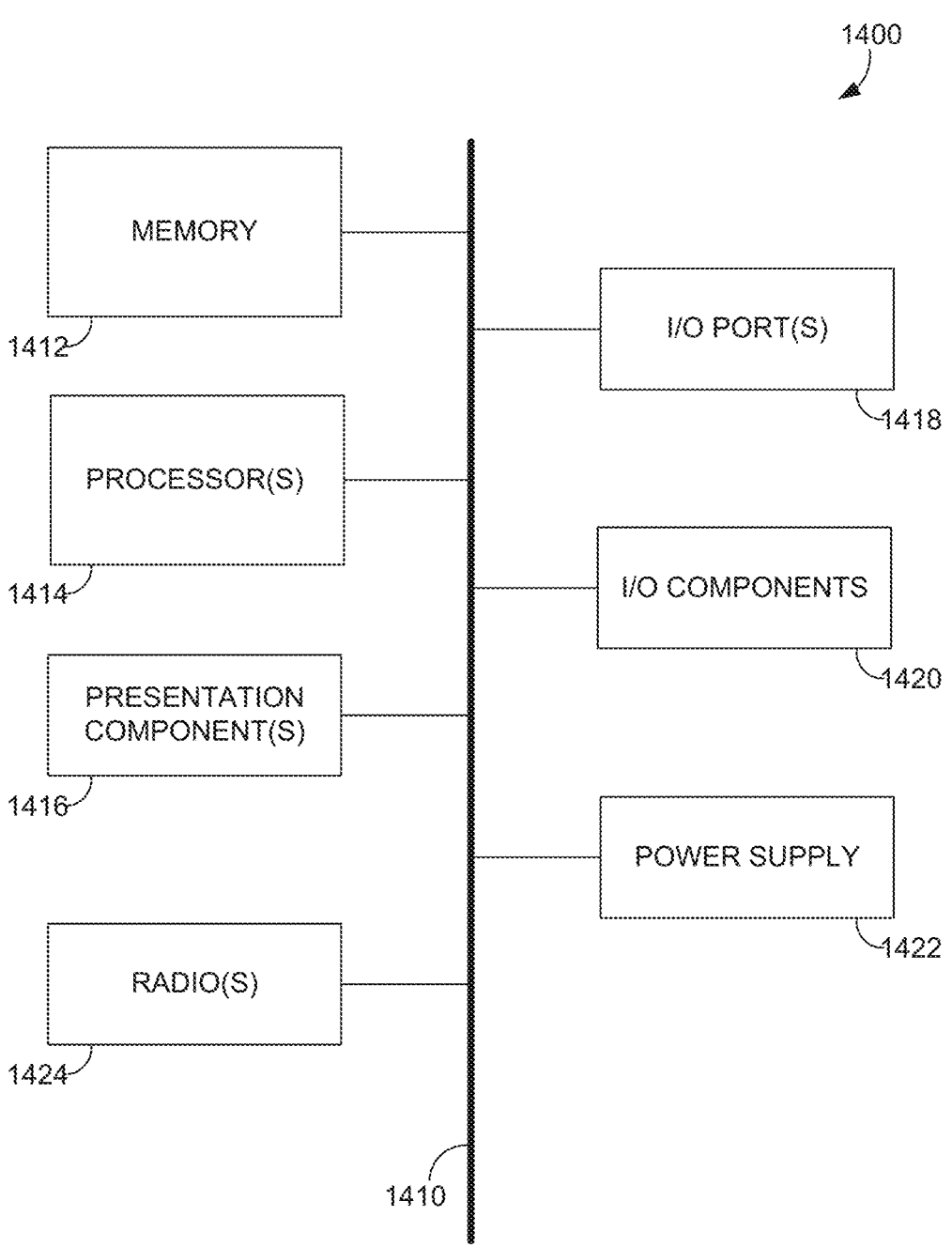
FIG. 14 is a block diagram of an example computing device in which embodiments of the present disclosure can be employed.

Referring to the drawings in general, and initially to FIG. 14 in particular, an exemplary operating environment for implementing aspects of the technology described herein is shown and designated generally as computing device 1400. Computing device 1400 is just one example of a suitable computing environment and is not intended to suggest any limitation as to the scope of use or functionality of the technology described herein. Neither should the computing device 1400 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 14, computing device 1400 includes a bus 1410 that directly or indirectly couples the following devices: memory 1412, one or more processors 1414, one or more presentation components 1416, input/output (I/O) ports 1418, I/O components 1420, an illustrative power supply 1422, and a radio(s) 1424. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 14 is merely illustrative of an exemplary computing device that can be used in connection with one or more aspects of the technology described herein. Distinction is not made between such categories as "workstation," "server," "laptop," and "handheld device," as all are contemplated within the scope of FIG. 14 and refer to "computer" or "computing device."

Computing device 1400 typically includes a variety of computer-readable media. Computer-readable media can be any available media that can be accessed by computing device 1400 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1412 includes computer storage media in the form of volatile and/or nonvolatile memory. The memory 1412 may be removable, non-removable, or a combination thereof. Exemplary memory includes solid-state memory, hard drives, and optical-disc drives. Computing device 1400 includes one or more processors 1414 that read data from various entities such as bus 1410, memory 1412, or I/O components 1420. Presentation component(s) 1416 present data indications to a user or other device. Exemplary presentation components 1416 include a display device, speaker, printing component, and vibrating component. I/O port(s) 1418 allow computing device 1400 to be logically coupled to other devices including I/O components 1420, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1414 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 1400. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1400. The computing device 1400 may be equipped with depth cameras, such as stereoscopic camera systems, infrared camera systems, RGB camera systems, and combinations of these, for gesture detection and recognition. Additionally, the computing device 1400 may be equipped with accelerometers or gyroscopes that enable detection of motion. The output of the accelerometers or gyroscopes may be provided to the display of the computing device 1400 to render immersive augmented reality or virtual reality.

A computing device may include radio(s) 1424. The radio 1424 transmits and receives radio communications. The computing device may be a wireless terminal adapted to receive communications and media over various wireless networks. Computing device 1400 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:

training an emulator to predict corresponding data structures from a plurality of non-differentiable image processing control parameters, the corresponding data structures being differentiable with respect to each control parameter of the plurality of non-differentiable image processing control parameters, training the emulator by:

predicting initial data structures based on an initial set of control parameters;

generating a set of predicted training images based on applying the initial data structures to a set of training images;

generating a set of ground truth images by applying the initial set of control parameters to the set of training images using non-differentiable image processing; and backpropagating a loss function based on the set of predicted training images and the set of ground truth images into a neural network of the emulator;

training a translator to predict a predicted set of control parameters from the plurality of non-differentiable image processing control parameters using the corresponding data structures predicted by the emulator;

generating an updated image by applying the predicted set of control parameters to an input image; and causing display of the updated image and the predicted set of control parameters.

2. The computer-implemented method of claim 1, wherein the input image and the updated image are frames of a video.

3. The computer-implemented method of claim 1, wherein generating the updated image by applying the predicted set of control parameters to the input image further comprises:

applying, by the emulator, predicted corresponding data structures from the predicted set of control parameters to the input image; and causing display of the updated image and the predicted set of control parameters through the emulator.

4. The computer-implemented method of claim 1, wherein generating the updated image by applying the predicted set of control parameters to the input image further comprises:

applying the predicted set of control parameters by a non-differentiable image processing application to the input image; and causing display of the updated image and the predicted set of control parameters through the non-differentiable image processing application.

5. The computer-implemented method of claim 1, wherein each of the corresponding data structures comprise at least one of a 3D look-up table (3D LUT) or a bilateral grid.

6. The computer-implemented method of claim 1, wherein the emulator comprises a transformer model.

7. The computer-implemented method of claim 1, wherein the initial set of control parameters are randomly selected, the initial data structures correspond to an initial 3D look-up table (3D LUT), the set of predicted training images are generated by applying tri-linear interpolation to the set of training images using the initial 3D LUT, and the set of training images are adjusted to be low resolution.

8. The computer-implemented method of claim 1, wherein the initial set of control parameters are randomly selected, the initial data structures correspond to an initial bilateral grid, the set of predicted training images are generated by applying bilateral filtering to the set of training images using the initial bilateral grid, and the set of training images are adjusted to be low resolution.

9. The computer-implemented method of claim 1, wherein the translator is trained to predict the predicted set of control parameters for a task and the task is at least one of auto-tone, auto-color-recommendation, harmonization, relighting, exemplar-based style transfer, language-driven editing, and or shadow removal.

10. The computer-implemented method of claim 1, wherein the translator is trained to predict the predicted set of control parameters for a style of a reference image.

11. The computer-implemented method of claim 1, wherein the predicted set of control parameters comprises a first set of predicted control parameters for a corresponding predicted mask and a second set of predicted control parameters for an area outside of the corresponding predicted mask.

12. One or more computer storage media having a plurality of executable instructions embodied thereon, which, when executed by one or more processors, cause the one or more processors to perform a method comprising:

training an emulator to predict corresponding data structures from a plurality of non-differentiable image processing control parameters, the corresponding data structures being differentiable with respect to each control parameter of the plurality of non-differentiable image processing control parameters, training the emulator by:

predicting initial data structures based on an initial set of control parameters;

generating a set of predicted training images based on applying the initial data structures to a set of training images;

generating a set of ground truth images by applying the initial set of control parameters to the set of training images using non-differentiable image processing; and backpropagating a corresponding loss function based on the set of predicted training images and the set of ground truth images into a neural network of the emulator;

training a translator to predict a predicted set of control parameters for a task from the plurality of non-differentiable image processing control parameters by:

receiving, by the translator, a set of unadjusted training images for the task;

predicting, by the translator, an initial predicted set of control parameters based on the set of unadjusted training images for the task;

generating, by the emulator, an initial set of adjusted training images for the task by applying predicted corresponding data structures based on the initial predicted set of control parameters to the set of unadjusted training images; and backpropagating a loss function into the translator to determine the predicted set of control parameters, the loss function determined based on the initial set of adjusted training images for the task and a set of training ground truth images for the task;

generating an updated image by applying the predicted set of control parameters to an input image; and causing display of the updated image and the predicted set of control parameters.

13. The media of claim 12, wherein the set of unadjusted training images and the set of training ground truth images are adjusted to be low resolution.

14. The media of claim 12, wherein the task is at least one of auto-tone, auto-color-recommendation, harmonization, relighting, exemplar-based style transfer, language-driven editing, or shadow removal.

15. The media of claim 12, wherein the predicted set of control parameters comprises a first set of predicted control parameters for a corresponding predicted mask and a second set of predicted control parameters for an area outside of the corresponding predicted mask.

16. The media of claim 12, wherein the corresponding data structures comprise at least one of a 3D look-up table (3D LUT) or a bilateral grid.

17. A computing system comprising:

a processor; and a non-transitory computer-readable medium having stored thereon instructions that when executed by the processor, cause the processor to perform operations including:

predicting, by a translator, a predicted set of control parameters from a plurality of non-differentiable image processing control parameters for a style of a reference image by:

receiving, by the translator, the reference image;

predicting, by the translator, an initial predicted set of control parameters based on at least one of an input image or the reference image;

generating, by an emulator, an initial updated image by applying predicted corresponding data structures based on the initial predicted set of control parameters to the input image, the emulator trained to predict corresponding data structures from the plurality of non-differentiable image processing control parameters, the corresponding data structures being differentiable with respect to each control parameter of the plurality of non-differentiable image processing control parameters, training the emulator by:

predicting initial data structures based on an initial set of control parameters;

generating a set of predicted training images based on applying the initial data structures to a set of training images;

generating a set of ground truth images by applying the initial set of control parameters to the set of training images using non-differentiable image processing; and backpropagating a corresponding loss function based on the set of predicted training images and the set of ground truth images into a neural network of the emulator; and backpropagating a loss function into the translator to determine the predicted set of control parameters, the loss function determined based on the initial updated image and the reference image;

generating an updated image by applying the predicted set of control parameters to the input image; and causing display of the updated image and the predicted set of control parameters.

18. The system of claim 17, wherein the reference image and the input image are adjusted to be low resolution during training of the translator.

19. The system of claim 17, wherein the reference image is generated by a language model.

20. The system of claim 17, wherein the predicted set of control parameters comprises a first set of predicted control parameters for a corresponding predicted mask and a second set of predicted control parameters for an area outside of the corresponding predicted mask.

* * * * *